US010348866B2

(12) United States Patent
Yin et al.

(10) Patent No.: US 10,348,866 B2
(45) Date of Patent: Jul. 9, 2019

(54) APPARATUS, SYSTEM AND METHOD TO PROVIDE IOT CLOUD BACKEND SERVICE

(71) Applicant: Wuhan MBaaS Computing Co. Ltd., Wuhan (CN)

(72) Inventors: Zhishuai Yin, Wuhan (CN); Baoguo Wei, Salem, NH (US)

(73) Assignee: Wuhan MBaaS Computing Co. Ltd., Wuhan (CN)

( * ) Notice: Subject to any disclaimer, the term of this patent is extended or adjusted under 35 U.S.C. 154(b) by 185 days.

(21) Appl. No.: 15/436,420

(22) Filed: Feb. 17, 2017

(65) Prior Publication Data

US 2017/0244814 A1   Aug. 24, 2017

Related U.S. Application Data

(60) Provisional application No. 62/297,291, filed on Feb. 19, 2016.

(51) Int. Cl.
| | |
|---|---|
| *G06F 15/177* | (2006.01) |
| *H04L 29/06* | (2006.01) |
| *H04L 29/08* | (2006.01) |
| *G06F 9/54* | (2006.01) |

(52) U.S. Cl.
CPC .............. *H04L 69/08* (2013.01); *G06F 9/547* (2013.01); *H04L 63/0428* (2013.01); *H04L 67/10* (2013.01); *H04L 67/12* (2013.01)

(58) Field of Classification Search
USPC .......................... 709/206, 217, 220, 230, 246
See application file for complete search history.

(56) References Cited

U.S. PATENT DOCUMENTS

| | | |
|---|---|---|
| 8,739,282 B1 | 5/2014 | Jayaraman et al. |
| 8,832,644 B2 | 9/2014 | Hirsch et al. |
| 8,943,086 B2 | 1/2015 | Moser et al. |
| 8,978,006 B2 | 3/2015 | Hirsch et al. |
| 8,997,038 B2 | 3/2015 | Bozek et al. |
| 9,047,308 B2 | 6/2015 | Bickle et al. |
| 9,081,579 B2 | 7/2015 | Sharrma et al. |
| 9,134,964 B2 | 9/2015 | Hirsch et al. |
| 9,189,376 B2 | 11/2015 | Jayaraman et al. |
| 9,218,164 B2 | 12/2015 | Ortiz |

(Continued)

*Primary Examiner* — Liang Che A Wang
(74) *Attorney, Agent, or Firm* — Rhodes Donahoe, LLC; Robert V. Donahoe

(57) ABSTRACT

A system is configured to provide an IoT device with access to cloud resources. The system includes a backend system configured to provide at least one service selected from a group consisting of: data management, file management, user management, and device management. The system also includes an IoT client device including an IoT device and a backend services module in communication with the IoT device, the IoT client device is configured to communicate with the backend system over a wide area network. The backend services module includes an IoT protocol engine configured to identify an API call for the backend system from a message communicated from the IoT device and a backend services API engine in communication with the IoT protocol engine, the backend services module configured to generate the identified API call. The backend services module also includes an Internet stack for communication of the API call to the backend system;

6 Claims, 15 Drawing Sheets

(56) References Cited

U.S. PATENT DOCUMENTS

| | | |
|---|---|---|
| 9,253,285 B2 | 2/2016 | McLane et al. |
| 2008/0112349 A1* | 5/2008 | Lewis ................. H04L 12/1836 370/312 |
| 2011/0093937 A1* | 4/2011 | Mantle ................ G06F 21/6218 726/6 |
| 2014/0282397 A1 | 9/2014 | Nielsen et al. |
| 2015/0234639 A1 | 8/2015 | Allsbrook |
| 2015/0365348 A1 | 12/2015 | Matsuda |
| 2016/0037482 A1 | 2/2016 | Higgins et al. |
| 2017/0026488 A1* | 1/2017 | Hao ........................ H04L 67/32 |
| 2017/0220432 A1* | 8/2017 | Misra ................. G06F 11/2092 |

* cited by examiner

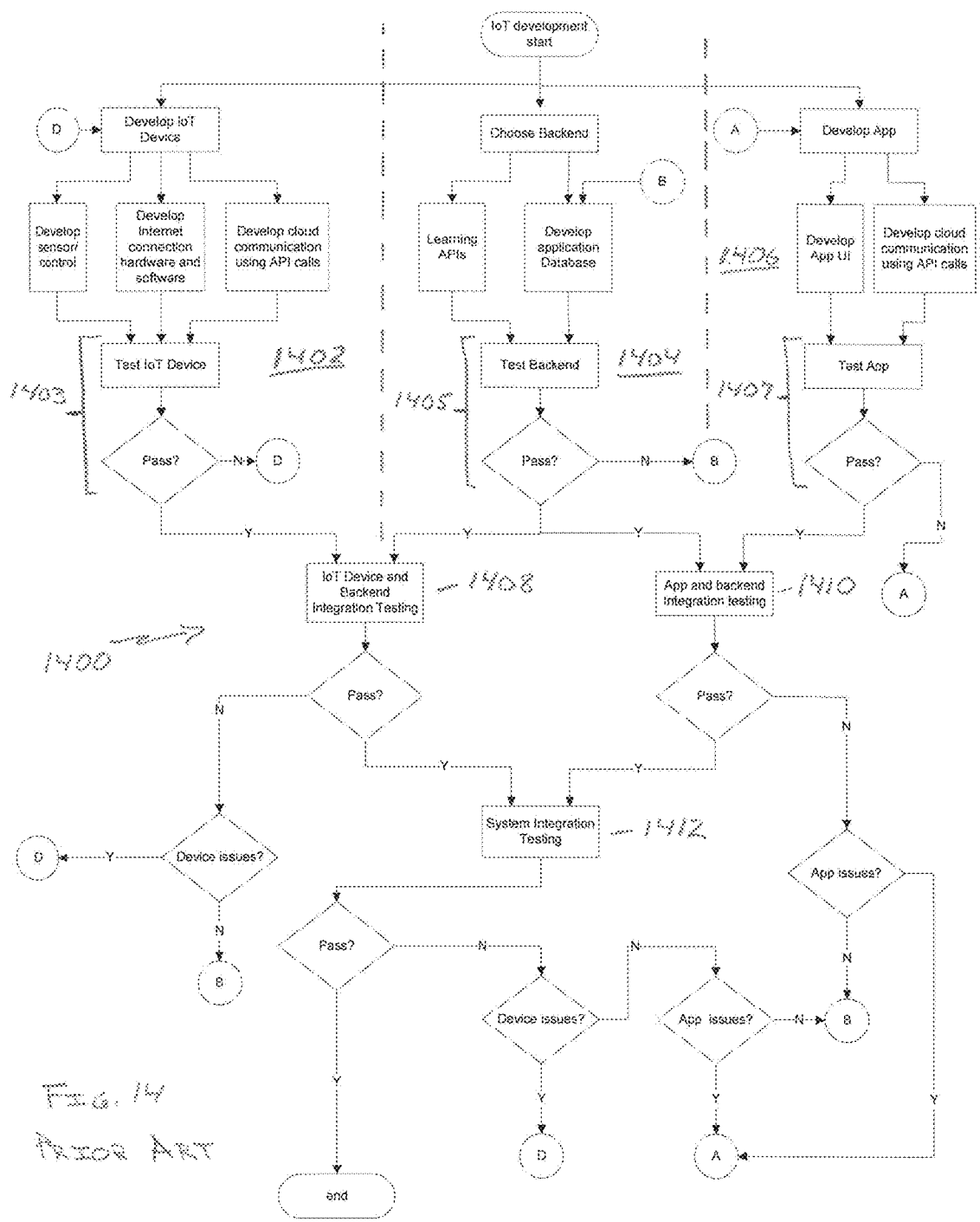

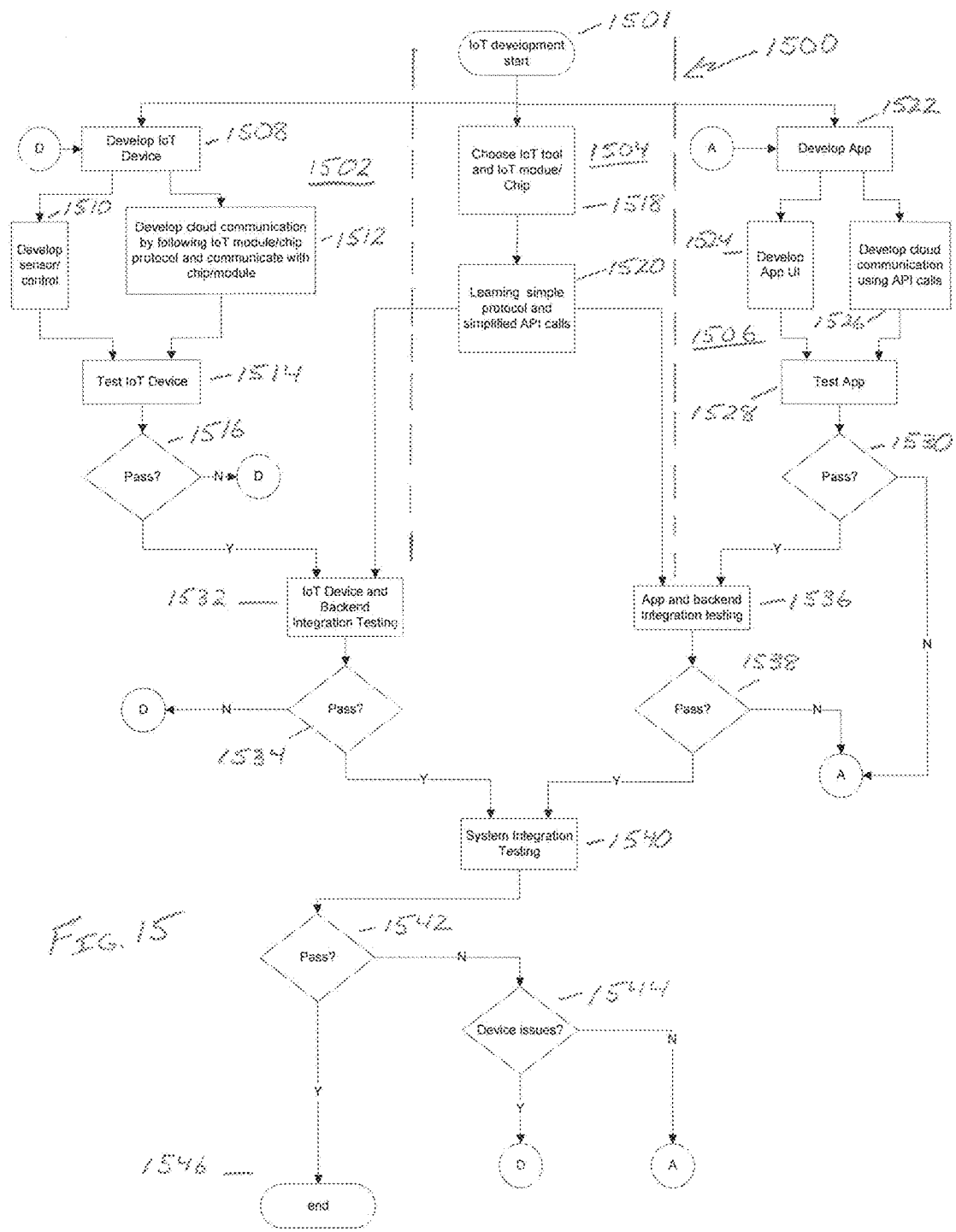

US 10,348,866 B2

APPARATUS, SYSTEM AND METHOD TO PROVIDE IOT CLOUD BACKEND SERVICE

RELATED APPLICATIONS

The application claims the benefit under 35 U.S.C. § 119(e) to U.S. Provisional Application Ser. No. 62/297,291, entitled "A METHOD AND SYSTEM TO PROVIDE IoT DEVICE CLOUD BACKEND SERVICE," filed on Feb. 19, 2016, the disclosure of which is herein incorporated by reference in its entirety.

BACKGROUND OF THE INVENTION

Field of the Invention

The present invention relates generally to provide backend service for development of IoT devices and mobile applications. More particularly the present invention relates to apparatus, systems and methods to aid in the development of Internet of things (IoT) devices and applications using prebuilt cloud backend infrastructure and IoT device interface hardware and software.

Description of Related Art

Forecasts predict that there will be 50-75 billion IoT devices in existence by the year 2020. Application software is required to run each such device. In addition, most of these devices will require access to the Internet. As the popularity and complexity of IoT applications has increased, more application developers use third party application development platforms in an attempt to develop IoT devices more quickly and reduce costs. In general, IoT devices also include some form of associated user interface most often provided in the form of a mobile application operating on a handheld electronic device. Web applications can also be used.

Application development platforms may offer data and file storage, user and device management and push notification and other functions that applications may interact with over a network. Most of these platforms were developed and designed for mobile applications development. Typically mobile applications developers use APIs provided for a particular platform to access these functions. However, the APIs for these platforms are not easily suited for the wide "universe" of IoT devices.

Adapting these platforms for IoT application created a number of problems that cause delays in development and increase development costs. A first problem is that IoT devices include a much broader and diverse variety of underlying hardware and software operating system environments. Thus, platforms developer cannot come up with a few SDKs to cover the majority of applications development. This is in contrast to the "universe" of mobile applications. Here, a platform developer may only need three SDKs to cover majority of applications, for example, SDKs for each of iOS, Android for mobile applications and Rest for web applications. In the case of the Internet of Things, there are many more software operating systems to address and an even greater number of hardware variations. This makes it nearly impossible for platform developer to be able to meet IoT application development needs.

A second problem is that the majority of IoT developers have a very different set of skills and experience than both mobile app developers and backend developers. The preceding results from the fact that the development tools and development environments employed by IoT developers are substantially different than those typically employed by mobile app developers and backend developers. Thus, even where a platform exists that is suitable for use as an IoT development system, the IoT development engineers may not have the knowledge and skills to quickly use the platform.

Referring to FIG. 13, a flow diagram of first IoT development process 1300 is illustrated according to the prior art. The process 1300 is employed, for example, when development includes each of development of the IoT device(s) and development of the backend employed in combination with the IoT device(s). The process also includes the development of a web or mobile application employed with the IoT device(s).

The process 1300 includes each of device development 1302, backend development 1304, and app development 1306. The device development 1302 includes device testing at act 1303. The backend development includes backend testing at act 1305. The app development 1306 includes app testing at act 1307. The process 1300 also includes an act of testing the IoT device and backend integration 1308, an act of testing the app and backend integration 1310 and an act of testing the system integration 1312.

If the IoT device passes the device testing at act 1303, the device development 1302 concludes and the process 1300 moves to the act of testing the IoT device and backend integration 1308. Otherwise, the process 1300 returns to the start of the device development 1302 for follow-up development. If the backend development 1304 passes the backend testing at act 1305, the backend development 1304 concludes and the process 1300 moves to the act of testing the IoT device and backend integration 1308 and the act of testing the app and backend integration 1310. Otherwise, the process 1300 returns to start of the backend development 1304 for follow-up development. If the app development 1306 passes the app testing at act 1307, the app development 1306 concludes and the process 1300 moves to the act of testing the app and backend integration 1310. Otherwise, the process 1300 returns to start of the backend development 1306 for follow-up development.

The process 1300 moves to the act of testing the system integration 1312 when each of the acts of testing the IoT device and backend integration 1308 and testing the app and backend integration 1310 are successfully completed. The act of testing the system integration 1312 includes overall testing of the operation of the IoT system with the IoT device, the backend and the app employed together. The process 1300 ends when the act of testing the system integration 1312 is successfully completed. For example, when there are no device issues or app issues that result from the act of testing the system integration 1312.

FIG. 13 illustrates the problems and challenges facing developers when they perform a custom development of both the IoT device and the backend to support the IoT device. For example, the developer must include time and resources in the device development 1302 to develop the Internet connection hardware and software included in the IoT device. In addition, the developer must include substantial time and resources in the backend development 1304 to develop backend architecture, a backend database and APIs specific to the backend for use with the IoT device.

The preceding challenges motivate some developers to employ a third party backend in the interest of reducing the time and costs associated with the full development project. However, even this approach fails to address some of the significant problems described above regarding the process 1300. As described in more detail below, the development of the IoT device using a third party backend does not eliminate the need to develop hardware and software to support Internet connectivity of the device nor does it eliminate the need to learn the complex APIs employed in the system.

Referring now to FIG. 14, a process 1400 is illustrated for IoT development when employing a third party backend. The process 1400 includes each of device development 1402, backend development 1404, and app development 1406. The device development 1402 includes device testing at act 1403. The backend development includes backend testing at act 1405. The app development 1406 includes app testing at act 1407. The process 1400 also includes an act of testing the IoT device and backend integration 1408, an act of testing the app and backend integration 1410 and an act of testing the system integration 1412.

If the IoT device passes the device testing at act 1403, the device development 1402 concludes and the process 1400 moves to the act of testing the IoT device and backend integration 1408. Otherwise, the process 1400 returns to the start of the device development 1402 for follow-up development. If the backend development 1404 passes the backend testing at act 1405, the backend development 1404 concludes and the process 1400 moves to the act of testing the IoT device and backend integration 1408 and the act of testing the app and backend integration 1410. Otherwise, the process 1400 returns to start of the backend development 1404 for follow-up development. If the app development 1406 passes the app testing at act 1407, the app development 1406 concludes and the process 1400 moves to the act of testing the app and backend integration 1410. Otherwise, the process 1400 returns to start of the backend development 1406 for follow-up development.

The process 1400 moves to the act of testing the system integration 1412 when each of the acts of testing the IoT device and backend integration 1408 and testing the app and backend integration 1410 are successfully completed. The act of testing the system integration 1412 includes overall testing of the operation of the IoT system with the IoT device, the backend and the app employed together. The process 1400 ends when the act of testing the system integration 1412 is successfully completed. For example, when there are no device issues or app issues that result from the act of testing the system integration 1412.

The process 1400 illustrates the significant amount of effort required by the developer despite the integration of a third party backend in the IoT development process. For example, the developer must still include time and resources in the device development 1402 to develop the Internet connection hardware and software included in the IoT device. This is despite the fact that Internet connectivity is a part of each IoT device. The device development also continues to require a development of cloud communication using API calls that are specific to backend. In addition, the backend development includes the learning, by the developer, of complex APIs for the third party backend. All of the preceding increases the complexity of the IoT development.

The many platforms for IoT development require developers to understand and develop expertise in writing software for several technology layers that may be common to IoT application and mobile application development. For example, in most cases, a developer must have expertise with several technology layers, such as, user-interface frameworks (UI), mobile networking, server networking, application logic (mobile client and service-side), database operations, machine level (hardware and/or virtual), or the like. Some of this complexity may be mitigated by integrating with generalized backend based services that may provide access to virtualized databases and virtualized server resources, but much of the application development complexity still remains the responsibility of the developers.

As described above, many challenges face the IoT application developer. At one end, the developer must develop customized hardware and also develop customized BIOS to support the hardware under a real time operating system or without an operating system. From there not only must the IoT developer address the sensor data collection and processing, the user interface development etc., the IoT developer must also develop the hardware, software and API calls to bring the data to the cloud backend system. This typically requires development of an Internet connection and the backend platform. Further, the IoT developer generally also must develop a mobile Application to interact with users who are consuming information for the IoT device and controlling the IoT devices. Work on all these various elements places a tremendous burden on the IoT developer.

SUMMARY OF THE INVENTION

Therefore there is a need for approaches that assist IoT developers in dealing with various tasks of IoT application development. For example, embodiments described herein can assist IoT developers developing mobile and/or web applications for use with IoT devices.

In at least one of the various embodiments, a backend platform can be a system that enables IoT application developers to enrich their mobile and IoT applications by accessing functions and services that can be provided by the backend platform. The backend platforms can provide a variety of predefined functions and API's that provide services useful to develop mobile and IoT applications. A backend platform can provide API's that can be used in mobile application and IoT application to provide services, such as, payment services, user management, data services (e.g., storage, searching, or the like), logging, or the like. By providing such services, a backend platform can reduce the difficulty of developing the IoT application and associated mobile applications.

In at least one of the various embodiments, IoT application developers can access the services of a backend platform by integrating their application with a backend platform interface. In other embodiments, the IoT application developers can integrate with the backend platform services using other mechanisms, such as, web applications, web services, or the like.

According to various aspects, an apparatus, system and method provide IoT application backend services. Depending on the embodiment, a backend platform could serve as a mobile application backend platform or an IoT application backend platform or both. Various embodiments described herein are directed towards IoT application development in a cloud-based architecture. In at least one of the various embodiments, an IoT application is designed to communicate with a backend over a network.

In at least one of the various embodiments, IoT application developers are enabled to design an IoT application to communicate with a backend over a network via a BaaS chip or module. According to these embodiments, when an IoT application communicates with a backend, it first communicates with a BaaS chip or module using a predefined protocol via a predefined hardware protocol on a hardware interface. In these embodiments, the BaaS chip or module implements all API calls to access backend services. For example, the BaaS chip receives a communication from IoT application and translates the IoT request to API calls. The BaaS chip then issues API calls to the backend to get the requested service and then relays the service to IoT application. According to these embodiments, when the backend provides service to IoT application, it first communicates with a BaaS chip or BaaS module. The BaaS chip or BaaS module passes the service to IoT application.

In these embodiments, the IoT application does not make any API calls because the communication between the backend and IoT application is through BaaS chip or BaaS module. Instead, the IoT application follows a simpler protocol that is familiar to IoT application developer. The protocol is configured to implement a subset of API calls in a format familiar to IoT application developers. The BaaS chip or BaaS module implement the full set of API calls. In some cases the BaaS chip or BaaS module implement some API calls for certain functions without the IoT application developer even knowing. As one example, user management can be implemented in BaaS chip or module. Because the BaaS chip or module builds BaaS calls on top of all protocols and hardware required to communicate with backend cloud, the IoT application does not need to implement the user management itself. The preceding saves time and money for IoT application developer.

In one aspect, a method integrates a cloud connected backend system with an IoT client device to provide services to the IoT client device via a wide area network. According to one embodiment, a backend system is configured to provide at least one service selected from a group consisting of: data management, file management, user management, and device management is provided. An IoT client device includes an IoT device and a backend services module. Receiving by the backend services module, an access request communicated from the IoT device to the backend services module requesting access to a service included in the at least one service. According to one embodiment, the access request is communicated in a message format native to the IoT device and non-native to the backend system. In a further embodiment, the backend services module automatically converts the access request into an API call in a format native to the backend system. The backend system is configured to operate to provide the service on receipt of the API call from the backend services module.

According to a further embodiment, the IoT device is programmed using a protocol that allows a developer to work in a format native to the IoT device to generate the access request communicated to the backend service module, wherein the format native to the backend system is non-native to the IoT device.

According to still another embodiment, the backend system includes at least one database and the IoT client device includes at least one sensor. In one version, the method includes generating a data management API call with the backend services module to communicate sensor output data from the at least one sensor to the backend system, and storing the sensor output data in the at least one database, where the sensor output data stored using the ID to associate the sensor output data with the IoT client device.

According to another aspect, a system is configured to provide an IoT device with access to cloud resources. According to one embodiment, the system includes: a backend system configured to provide at least one service selected from a group consisting of: data management, file management, user management, and device management; and an IoT client device including an IoT device and a backend services module in communication with the IoT device, the IoT client device configured to communicate with the backend system over a wide area network. According to further embodiments, the backend services module includes: an IoT protocol engine configured to identify an API call for the backend system from a message communicated from the IoT device; and a backend services API engine in communication with the IoT protocol engine, the backend services module configured to generate the identified API call. According to a still further embodiment, the backend services module includes an Internet stack for communication of the API call to the backend system, the message includes a request for access to the at least one service, and the API call is processed by the backend system to provide the requested service.

According to another embodiment, the backend services module is included in hardware including a processor and a memory coupled to the processor, the memory configured to store the API engine, the IoT protocol engine and the Internet stack.

According to yet another embodiment, the IoT device includes an encryption/decryption engine, the backend services module includes an encryption/decryption engine, According to this embodiment, messages are communicated from the IoT device to the backend services module in an encrypted form, and API calls are communicated from the backend services module to the backend system in an encrypted form.

According to still another aspect, a module is provided for integration with an IoT device to provide the IoT device with access to cloud-resources. According to some embodiments, the module includes an IoT protocol engine configured to identify an API call for the cloud-resources from a message communicated from the IoT device; a cloud-resources API engine in communication with the IoT protocol engine, the cloud-resources module configured to generate the identified API call, and an Internet stack for communication of the API call to the cloud-resources. According to further embodiments, the message includes a request for access to at least one service provided by the cloud-resources, and the API call is processed by the cloud-resources to provide the requested service.

In one embodiment, the module is included in hardware including a processor and a memory coupled to the processor, the memory configured to store the cloud-resources API engine, the IoT protocol engine and the Internet stack.

In another embodiment, the module is provided as a software module configured for integration with software native to the IoT device.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 14 illustrates a flow diagram of a second IoT development process according to the prior art; and FIG. 15 illustrates a flow diagram of an IoT development process in accordance with various embodiments.

DETAILED DESCRIPTION

Figure 1:
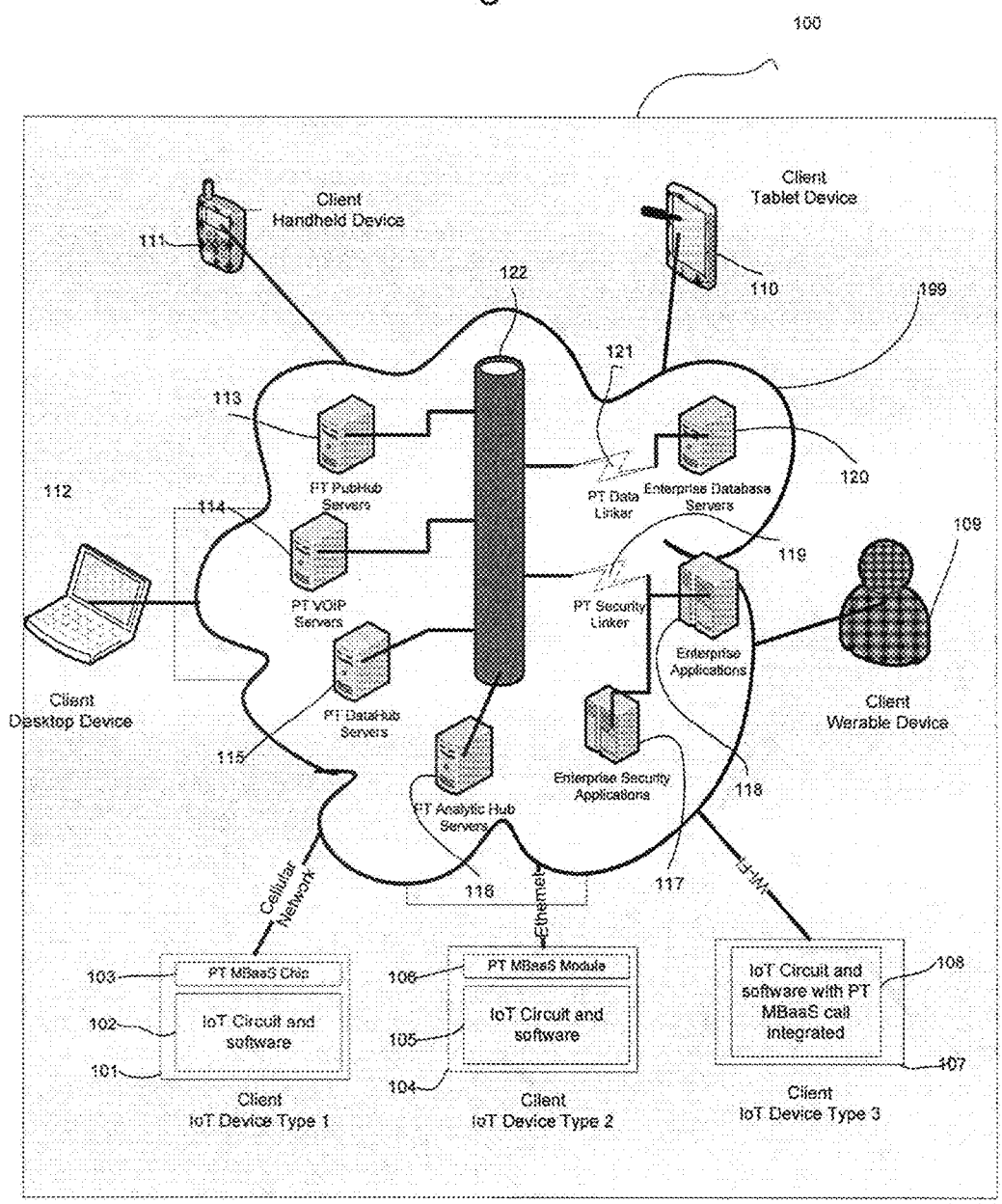
FIG. 1 illustrates a block diagram of a system in accordance with various embodiments.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

In referring to the description, specific details are set forth in order to provide a thorough understanding of the examples disclosed. In other instances, well-known methods, procedures, components and materials have not been described in detail as not to unnecessarily lengthen the present disclosure.

It should be understood that if an element or part is referred herein as being "on", "against", "in communication with", "connected to", or "coupled to" another element or part, then it can be directly on, against, in communication with, connected or coupled to the other element or part, or intervening elements or parts may be present. When used, term "and/or", includes any and all combinations of one or more of the associated listed items, if so provided.

The terminology used herein is for the purpose of describing particular embodiments only and is not intended to be limiting. As used herein, the singular forms "a", "an", and "the", are intended to include the plural forms as well, unless the context clearly indicates otherwise. It should be further understood that the terms "includes" and/or "including", when used in the present specification, specify the presence of stated features, integers, steps, operations, elements, and/or components, but do not preclude the presence or addition of one or more other features, integers, steps, operations, elements, components, and/or groups thereof not explicitly stated.

In the following description, reference is made to the accompanying drawings which are illustrations of embodiments in which the disclosed invention may be practiced. It is to be understood, however, that those skilled in the art may, in view of the disclosure herein, develop other structural and functional modifications without departing from the novelty and scope of the instant disclosure.

For example embodiments, the following terms are used herein according to the corresponding meaning, unless the context clearly dictates otherwise.

The Term "IoT" is an abbreviation of "Internet of things" as used herein refers to the ever-growing network of physical objects that feature an IP address for internet connectivity, and the communication that occurs between these objects and other Internet-enabled devices and systems. The Internet of Things (IoT) is the network of physical objects-devices, vehicles, buildings and other items which are embedded with electronics, software, sensors, and network connectivity, which enables these objects to collect and exchange data.

The term "IoT Backend platform" as used herein refers to an application platform that may provide cloud backend services that may be used by IoT application developers to simplify the development of their IoT applications. The IoT backend platform may be accessible over a network by IoT applications operating on IoT devices. The services provided by an IoT backend platform may vary, but they may provide, data management, user management, device management, push notification, social network integration, enterprise application and database integration, instant messaging, support for payment transactions, or the like. In at least one of the various embodiments, IoT backend platforms may be configured to provide service to general purpose applications in additional to IoT applications. While an IoT backend platform may be operative in a cloud-based environment, it is not so limited; other well-known operational architectures may be employed.

The term "Mobile Backend platform" as used herein refers to an application platform that may provide cloud backend services that may be used by Mobile application developers to simplify the development of their Mobile applications. The Mobile backend platform may be accessible over a network by Mobile applications operating on Mobile devices. The services provided by a Mobile backend platform may vary, but they may provide, data management, user management, device management, push notification, social network integration, enterprise application and database integration, instant messaging, support for payment transactions, or the like. In at least one of the various embodiments, Mobile backend platforms may be configured to provide service to general purpose applications in additional to Mobile applications. While a Mobile backend platform may be operative in a cloud-based environment, it is not so limited; other well-known operational architectures may be employed.

The term "Backend platform" as used herein can include the "IoT backend platform", and the "mobile backend platform" either alone or combination with one another or with other elements.

The term "API call" as used herein refers to an API call made from within an IoT or mobile application directed to services provided by a backend platform. IoT and Mobile application developers may use API calls to access the services provided by backend platforms. Function calls may correspond to built-in services that are provided by the backend platform.

The term "BaaS Chip", "BaaS module" as used herein refers to a chip or a module that has built in API calls to implement services provided by "Backend Platform". It also has an interface to a microprocessor or microcontroller so that the microprocessor and microcontroller can use access backend service in together with the chip or the module. The interface is a protocol that defines how a microprocessor or microcontroller communicates with the chip or the module".

The term "Backend Script" refers to selection of software source code that may be provided to the backend platform by an IoT or mobile application developer. Cloud script is a chunk of software that may be custom designed by the IoT or mobile application developer for use in one or more IoT or mobile application. The cloud script may be deployed to a backend platform and may be integrated into the backend platform services and made available one or more IoT or mobile applications. Cloud script may be developed using a variety of computer programming languages.

The term "backend script server" as used herein refers to a server and/or network device that may be configured to execute backend script modules. backend script server may be arranged to include one or more sandboxes for executing backend script.

The term "dock container" as used herein refers to a special purpose computing process that may reside on a backend server. Containers are designed to execute backend script in an instrumented and/or monitored runtime environment. They may include restrictions on the resources that may be accessed by the backend script being executed.

The term "IoT application" as used herein refers to a computing/software application designed to operate on an IoT device. IoT applications may include API calls that access services and features provided by a backend platform.

The term "IoT application developer" as used herein refers to users that design and develop IoT applications. IoT application developers may create and deploy cloud code that may be employed from within IoT application.

The term "mobile application" as used herein refers to a computing/software application designed to operate on a mobile device. Mobile applications may include API calls that access services and features provided by a backend platform.

The term "mobile application developer" as used herein refers to users that design and develop mobile applications. Mobile application developers may create and deploy cloud code that may be employed from within mobile application.

FIG. 1 a block diagram of a system 100 in which various embodiments may be implemented. Not all of the parts may be required to implement the various embodiments, and variations in the arrangement and type of the components may be made without departing from the spirit or scope of the various embodiments. According to the illustrated embodiment, the system 100 includes a backend network 199 that includes at least one server to support development and deployment of client IoT devices including three types of client IoT device: a first type of client IoT device 101; a second type of client IoT device 104; and a third type of client IoT device 107.

According to the illustrated embodiment, the first type of client IoT device 101 includes IoT hardware and software 102 and a BaaS chip 103. According to one embodiment, the BaaS chip 103 includes a BaaS API engine, an IoT protocol engine and an Internet stack, an IoT interface and a network interface.

According to the illustrated embodiment, the second type of client IoT device 104 includes IoT hardware and software 105 and a BaaS module 106. According to one embodiment, the BaaS module 106 is implemented with a set of software modules that includes a BaaS API engine, an IoT protocol engine, an Internet stack and an IoT software interface.

According to the illustrated embodiment, the third type of client IoT device 104 includes IoT hardware and software with BaaS calls integrated 107. According to one embodiment, the BaaS calls are generated using a BaaS API engine.

In various embodiments, backend network 199 enables one or more network services by using various networked computing device. In the illustrated embodiment, the networked computing devices include a pub/hub server devices 113 for messaging service; VOIP server devices 114 for voice and video messaging or chat service; DataHub server devices 115 for data storage, user management, data management, push notification, social network integration, user group management and analytic services; and AnalyticHub server devices 116 for data analysis and big data analysis services. Further, the networked computing devices include a Data Linker 121 to link to enterprise database server devices 120 and applications 118 to provider enterprise application and database services; and a Security linker 119 to link to enterprise security applications 117 to provide enterprise security service. According to various embodiments, the backend network 199 includes an intranet 122 to connect the networked computing devices. Depending on the embodiment, the networked computing devices can be in a single geographic location or a plurality of geographic locations.

According to some embodiments, one or more mobile devices can be included in cloud network 199 in one or more arrangements to provide one or more network services to a user. The various arrangements of networked computing devices illustrated and described herein may be employed together according to some embodiments. According to one embodiment, backend platform server device 113, 114, 115, 116 may include processes, modules, services, components, or the like, for managing requests and other communications to and from client devices that may be running various client applications.

Additionally, the user may employ a plurality of virtually any type of wired or wireless networked computing devices to communicate with cloud network 119 and access at least one of the network services. These networked computing devices may include client IoT device 101, client IoT device 104, client IoT device 107, tablet client device 110, handheld client device 111, wearable client device 109, desktop client device 112, and the like.

In the various embodiments, the information communicated to/from the backend network 199, the Data Linker, the Security Linker and intranet 122, may include virtually any kind of information including, but not limited to processor-readable instructions, data structures, program modules, applications, raw data, control data, archived data, video data, voice data, image data, text data, and the like.

Network 199 may be partially or entirely embodied by one or more wireless networks. A wireless network may include any of a variety of wireless sub-networks that may further overlay stand-alone ad-hoc networks, and the like. Such sub-networks may include mesh networks, Wireless LAN (WLAN) networks, Wireless Router (WR) mesh, cellular networks, pico networks, PANs, Open Air Laser networks, Microwave networks, and the like. Network 199 may further include an autonomous system of intermediate network devices such as terminals, gateways, routers, switches, firewalls, load balancers, and the like, which are coupled to wired and/or wireless communication links. These autonomous devices may be operable to move freely and randomly and organize themselves arbitrarily, such that the topology of network 199 may change rapidly.

One embodiment of a BaaS chip or module is described in more detail below in conjunction with FIG. 5 and FIG. 6. Generally, BaaS chip or module may employ a wired network, a wireless network, or some combination of wired and wireless networks.

In various embodiments, the backend network 199 may employ virtually any form of communication technology and topology. For example, network 199 can include local area networks Personal Area Networks (PANs), (LANs), Campus Area Networks (CANs), Metropolitan Area Networks (MANs) Wide Area Networks (WANs), direct communication connections, and the like, or any combination thereof. Communication can occur using any of Wi-Fi networks, Bluetooth™ communication, cellular networks, satellite communication, and peer-to-peer networks available either alone or in combination with one another. Other communication protocols and topologies can also be implemented in accordance with various embodiments.

Figure 2:
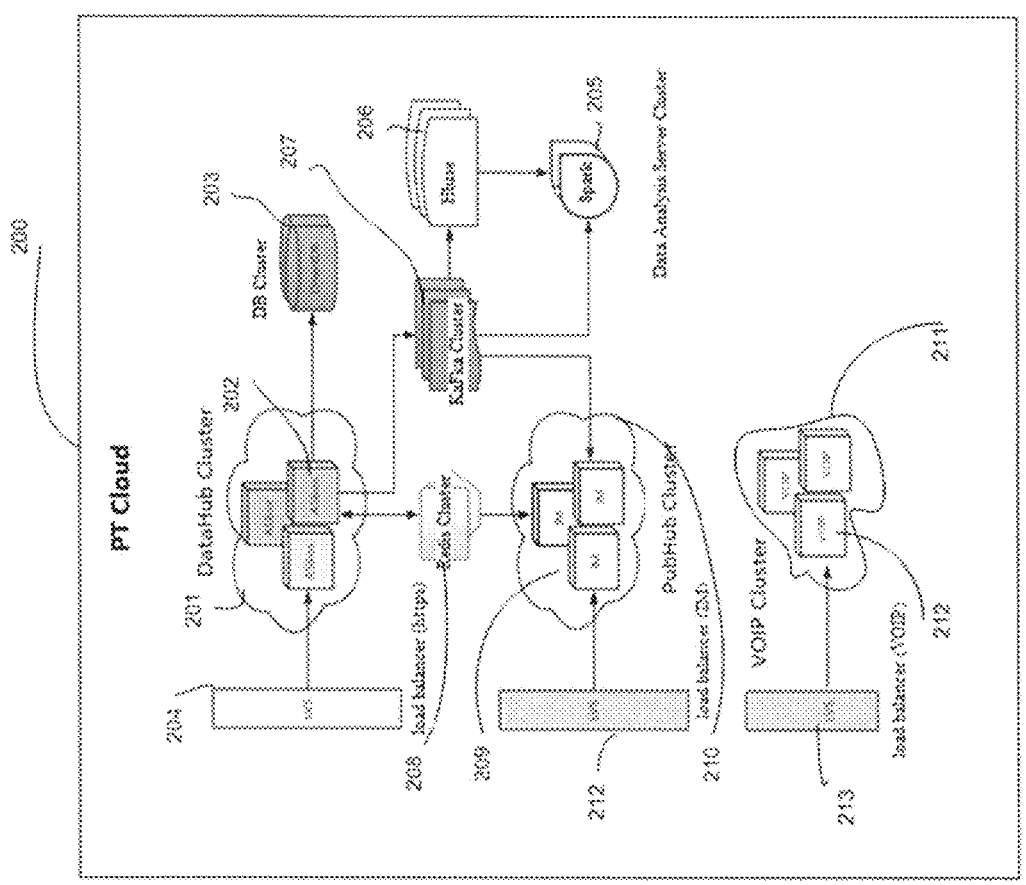
FIG. 2 illustrates a network cloud backend service in accordance with one embodiment.
Figure 3:
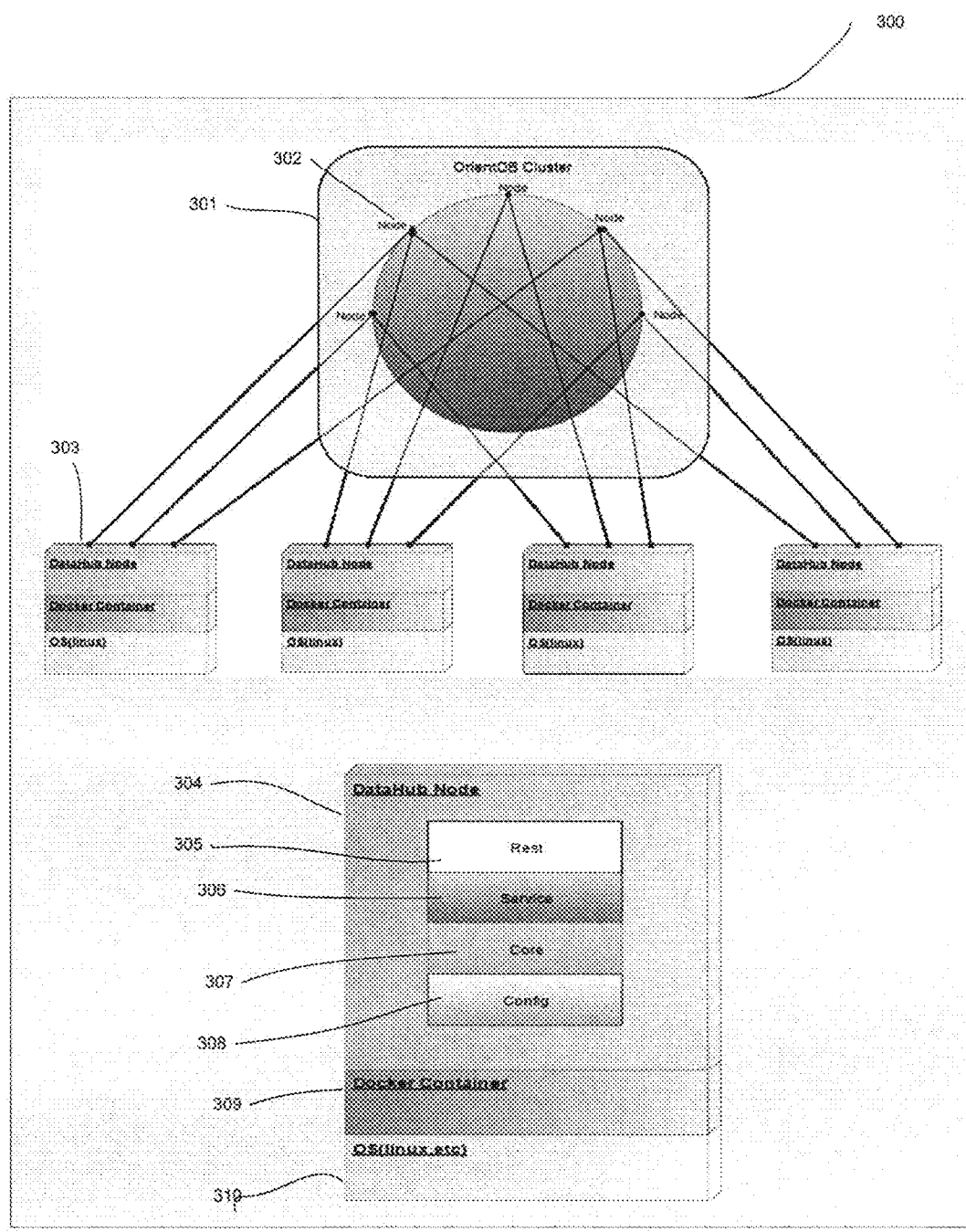
FIG. 3 illustrates a cloud backend data service in accordance with one embodiment.
Figure 4:
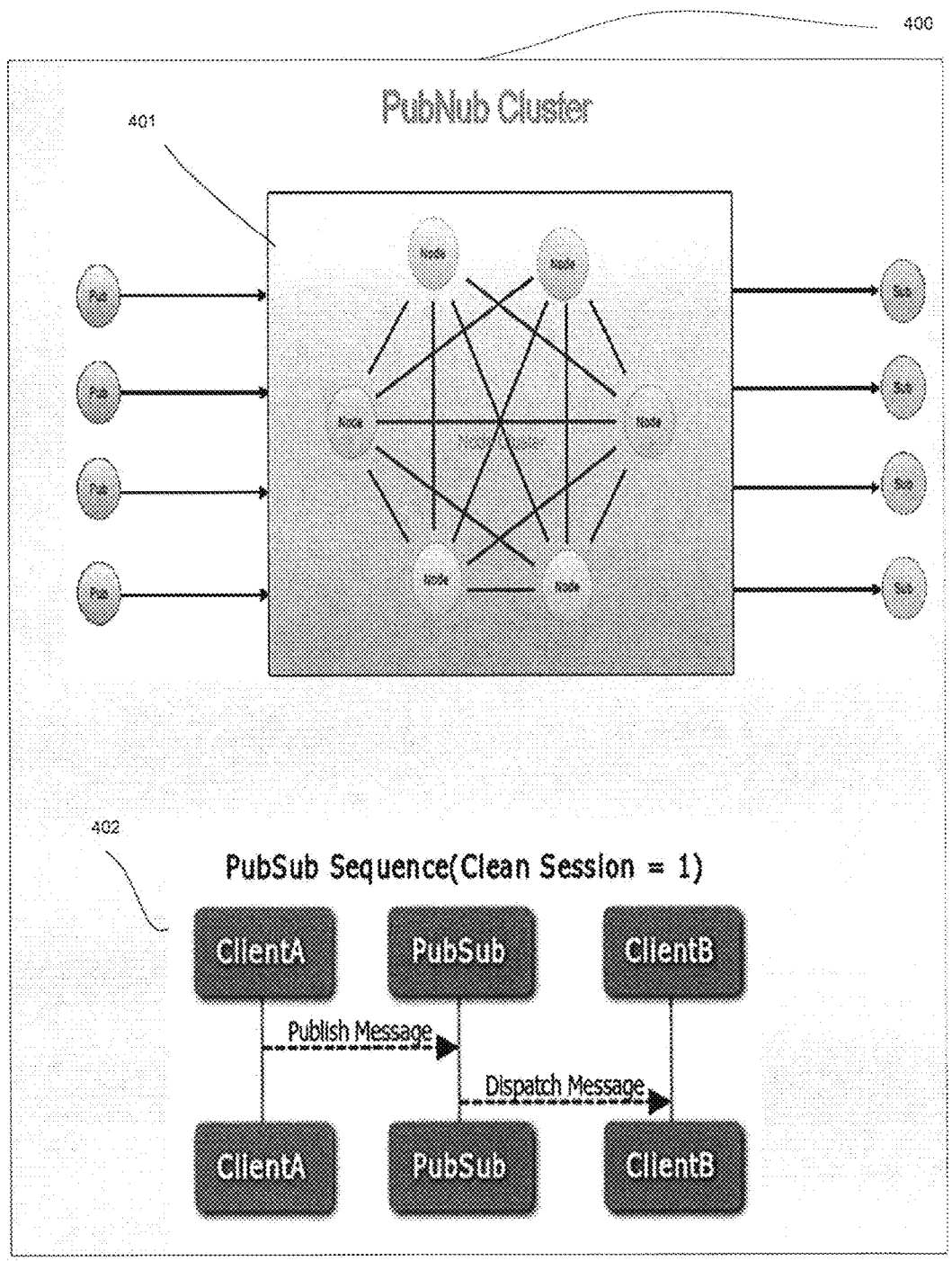
FIG. 4 illustrates a cloud backend messaging service in accordance with one embodiment.

FIG. 2, FIG. 3 and FIG. 4 provide more detailed illustrations of elements included in the backend network 199, for example, additional details concerning some of the backend platform server devices illustrated in FIG. 1. As described herein, in various embodiments, these elements provide backend services to IoT applications and mobile applications.

FIG. 2 illustrates details concerning the PubHub servers 113, the VOIP servers 114 and the DataHub servers 115 illustrated in FIG. 1. According to the embodiment illustrated in FIG. 2, the backend cloud 200 includes load balance servers 204, 212, 213 to distribute network load evenly across multiple servers. A DataHub Cluster 201 includes multiple servers 202 that connect to multiple databases 203. A messaging PubHub cluster 210 includes multiple instant messaging servers 209. A VOIP cluster 211 includes multiple VOIP servers 212. A Data Analysis Server Cluster 205 communicates with a database 206. The PubHub Cluster 210 communicates with DataHub Cluster 201 by a Redis cluster 208. The Data analysis Server cluster 205 by a Kafka cluster 207, DataHub Cluster 201 is in communication with Data Analysis Server Cluster 205 by Kafka cluster 207.

Depending on the embodiment, servers and computers referred in FIG. 1, FIG. 2, FIG. 3 and FIG. 4 can be any of a variety of servers employed in the industry, for example, a blade server. A blade server is a stripped down server computing device with a modular design optimized to minimize the use of physical space and energy. A tower type server provides another example, for example, a tower type server computer made by HP, Dell or IBM. In general, a server typically consists of processor(s) in communication with memory and may also include an input/output interface to communicate with other servers, devices, networks, and computers by wired or wireless network. A server may also include storage such as a fixed hard disk or removable disks, and can also include a power supply. The server memory can be RAM, ROM or Flash memory, etc. The server can also include a human interface.

A DataHub server 300 is illustrated in FIG. 3, for example, the DataHub server 115 illustrated in FIG. 1. In accordance with one embodiment, each individual data application server is connected as a node 302 to a database server cluster 301. In this embodiment, OrientDB is used as an example database, however, the database could be any database such as Oracle database, NoSql database, MonoDb etc. An application node 304 is built on top of an operating system 310 such as Linux. A Docker Container 309 that isolates application for portability is located on top of the OS 310 beneath the application node. In the application node 304, a backend service 306 sits on top of application core 307 and a config layer 308. The top layer 305 in the application layer 304 is an interface to conduct backend service.

FIG. 4 illustrates a PubSub messaging server 400, for example, as included in the PubHub server 113 illustrated in FIG. 1. According to one embodiment, interconnected PubSub nodes form multiple identifiable channels that could be used by IoT application to post messages or subscribe to for receiving messages.

Embodiments employing backend servers as illustrated in FIG. 2, FIG. 3 and FIG. 4 can provide those features typically provided in Backend as a Service (BaaS) approach such as data management, file management, user management, device management, push notification, instant messaging, social network integration. According to one embodiment, these services can be implemented as illustrated by the backend service 306 in FIG. 3. The services will be offered through API calls which are executed by the interface 305 in FIG. 3. As illustrated in FIG. 3, a Docker container 309 is provided for each node 304. According to this embodiment, the docker container is provided as an isolation layer between the backend application services and underlying operating system. This approach can allow the application services to be easily migrated from one cloud infrastructure provider, for example, Amazon to another such as Google cloud. This is important for many IoT/mobile application developers because they do not want lock their service to one vendor and have the option to deploy backend services using their own private cloud.

Figure 5:
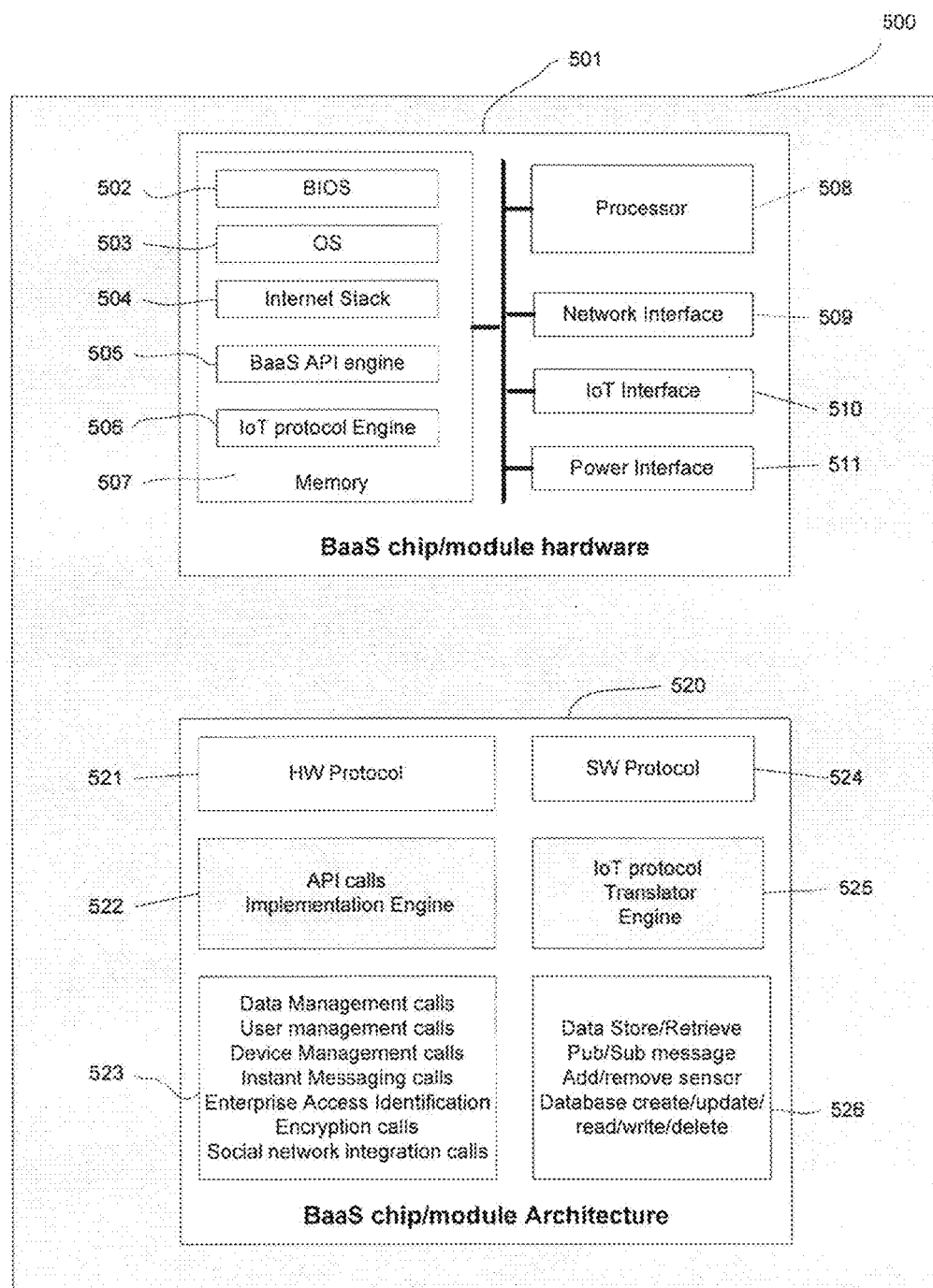
FIG. 5 illustrates a BaaS chip or module in accordance with one embodiment.

FIG. 5 is an example embodiment of a BaaS chip/module 500 in accordance with various embodiments. 520 is BaaS chip module architecture, majority of API calls 523 to access backend services are totally contained in BaaS chip/module 520. A portion of API calls 526 are implemented in BaaS chip/Module 520 which will be activated by communication from an IoT devices. API calls 523 are implemented through an API calls Implementation Engine 522. The Implementation Engine 522 is configured to implement API calls as microprocessor program instructions stored in computer storage which can be executed on demand or at preset times or events or periodically, For example, according to some embodiments, User Management Calls are executed at system power-up to identify the IoT device by the unique ID of BaaS chip/module 500. That is, each BaaS chip/module 500 is programmed at manufacturing to have a unique ID to identify itself. The programmed unique ID is initially used as a key to have the BaaS chip/module receive a permanent ID. This permanent ID is employed for security reasons to authenticate the client IoT device including the BaaS chip/module when device connects to backend. Thus, the permanent ID is a token for system to identify a particular IoT device. Another example is Enterprise Access Identification calls. These calls are executed when are needed, for example, when an IoT device issues an Enterprise Database/application access request.

The BaaS chip/module 520 has a HW protocol 521 to define hardware interface to an IoT device, the hardware interface can be one of industry standard interface such as SPI, I2C, UART, parallel bus, digital IO etc. The BaaS chip/module 520 has a SW protocol 524 to define software interface to an IoT device, an IoT device access backend services using SW protocol 524, an IoT protocol Translator Engine insides chip/module 520 translates message from IoT device to API calls to access backend services. Example messages types are in 526: Data Store/Retrieve message enables IoT device data to store to backend and retrieve it as needed; Pub/Sub message enables IoT device to publish messages to channels defined by backend and to listen messages from backend channels; Add/Remove sensor enables IoT device to add or remove sensor. Database create/update/read/write/delete enables IoT device to access enterprise application and database. All communications between BaaS chip/module and IoT device are to be encrypted.

FIG. 5 illustrates the BaaS chip/Module hardware 501 implemented in accordance with one embodiment. According to this embodiment, the BaaS chip/module hardware 501 includes a processor 508, a network interface 509, an IoT Interface 510 and a power interface 511. The BaaS chip/Module hardware 501 also includes a memory 507 that stores a BIOS 502, an OS 503, an Internet Stack 504, a BaaS API engine 505 and an IoT protocol engine 506. The processor 508 communicates with backend 199 through network interface 509 using Internet Stack 504 and BaaS API engine 505. In addition, the processor also communicates with IoT device through IoT interface following HW protocol 521 using the IoT protocol Engine 506 which implements the IoT protocol translator 525. Power Interface 511 is responsible for providing power to the Chip/Module 501.

Figure 8:
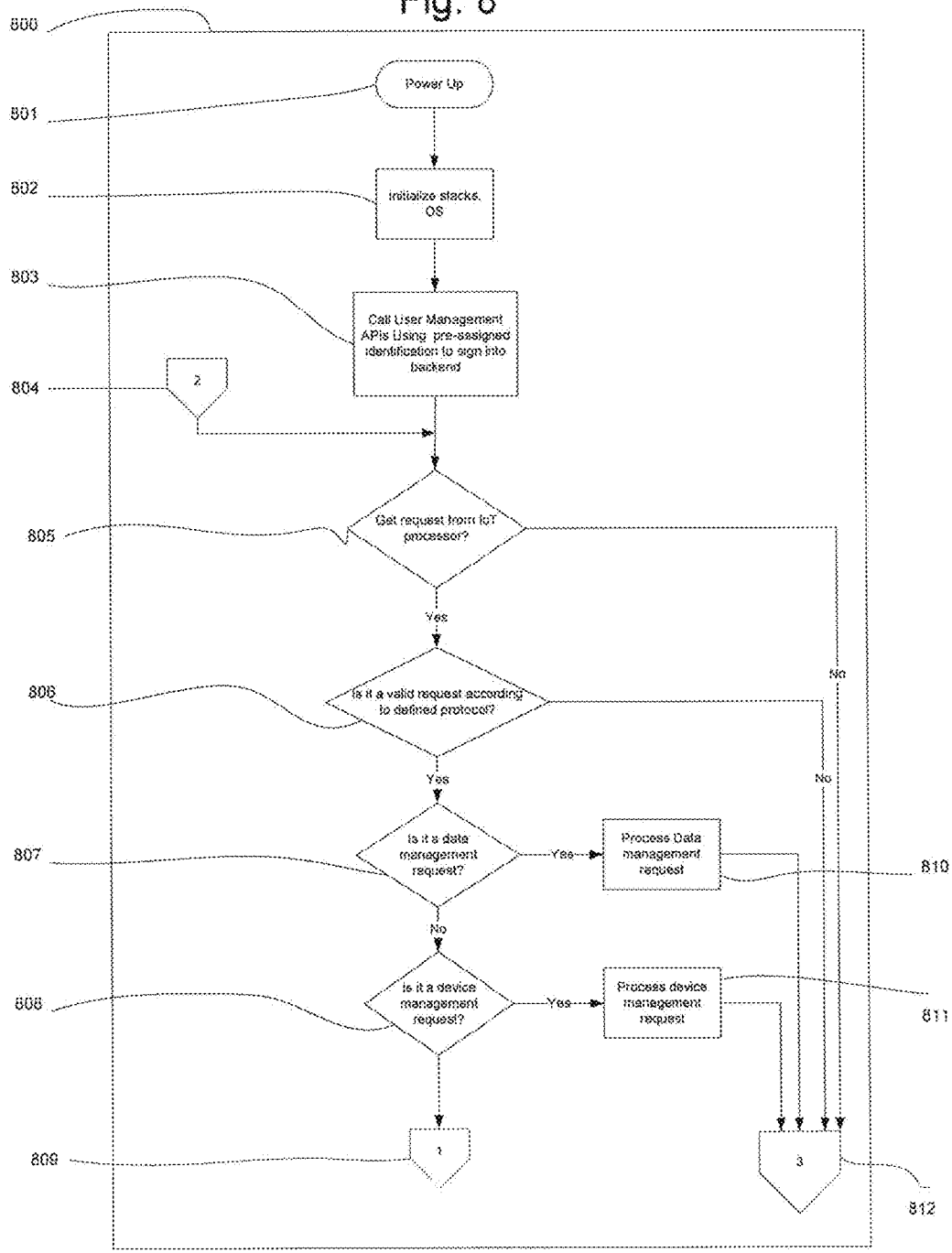
FIGS. 8 & 9 illustrate a communication flow of a system including BaaS backend services in accordance with one embodiment.
Figure 9:
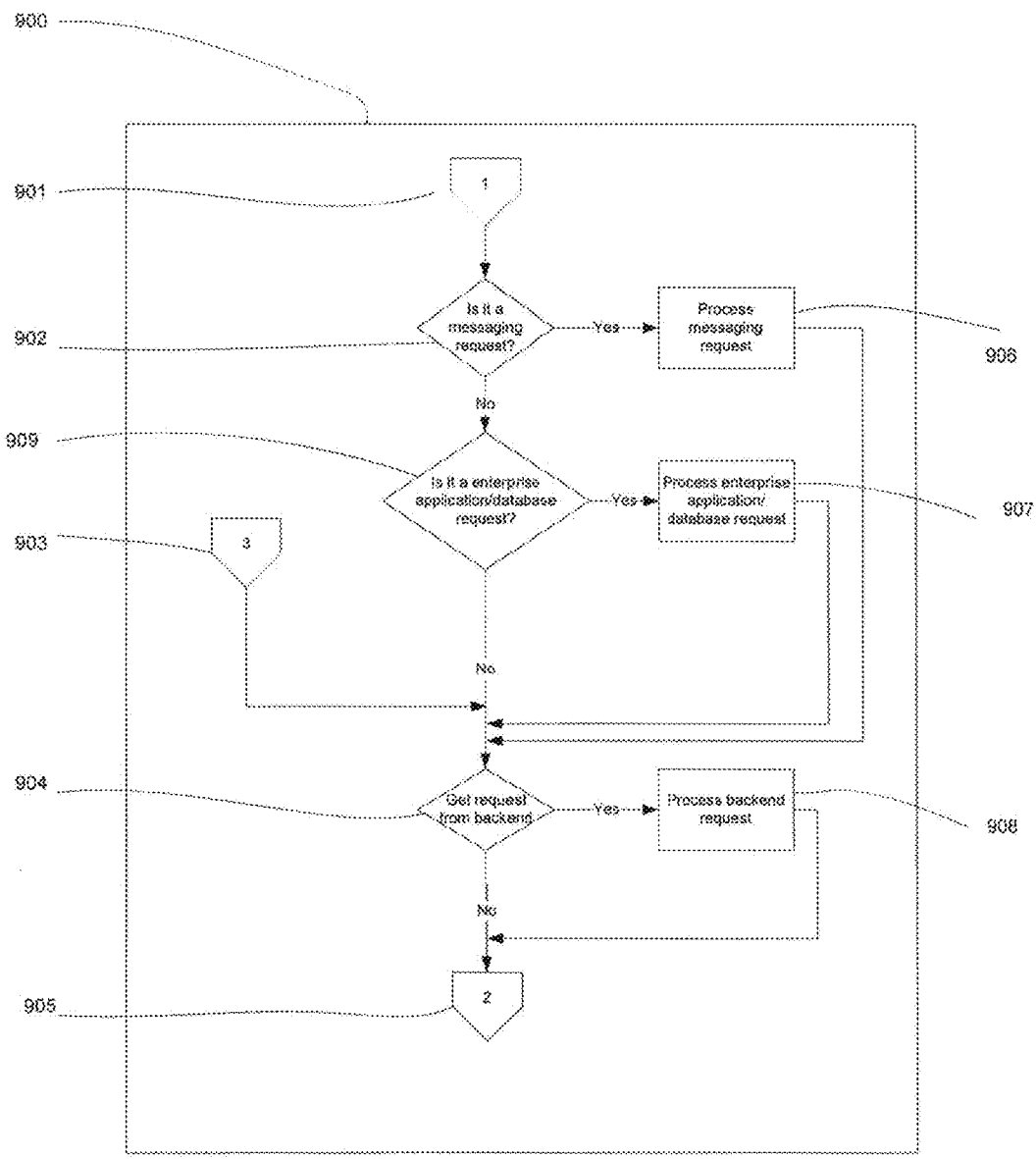
Figure 10:
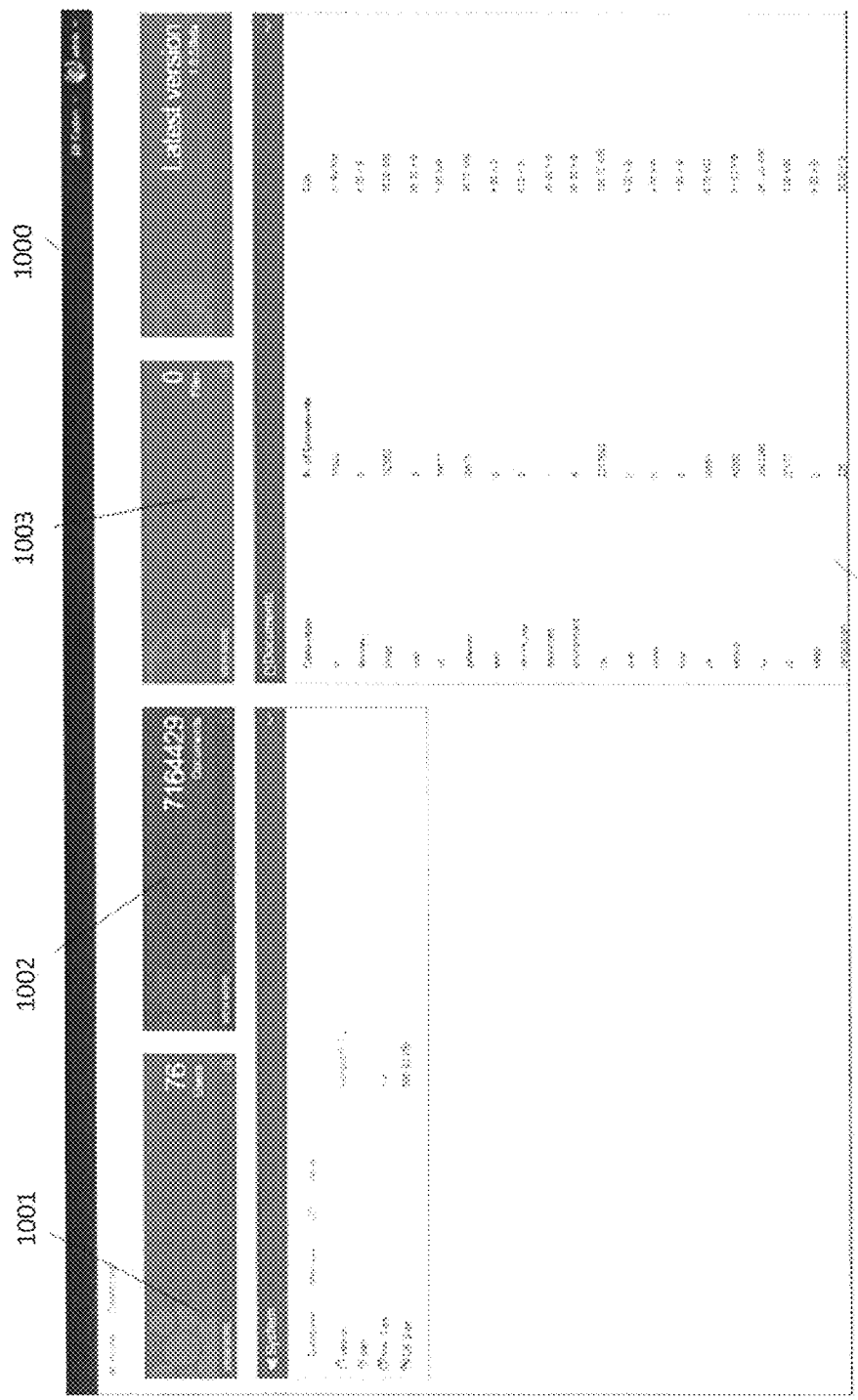
FIGS. 10-12 illustrate graphical user interfaces employed in a dashboard of the backend system in accordance with one embodiment.

According to various embodiments, the BaaS chip/Module 500 could be implemented as silicon chip by making it as a ASIC, or using a few discrete components such as a microprocessor, a RAM, a ROM, Ethernet chip/module, Wireless chip/Module, cellular communication chip (3G, 4G, LTE etc), satellite chip and Power chip and discrete components. The example here is only to illustrate the embodiment, by no means to limit how to implement the BaaS. An embodiment of the Internet Stack 504 is further illustrated in FIG. 6. Operation of the BaaS chip/module 500 is illustrated in FIG. 8 to FIG. 10. In various embodiments, all software running on BaaS chip/Module 500 can be upgraded via communication with the cloud backend 199.

Figure 6:
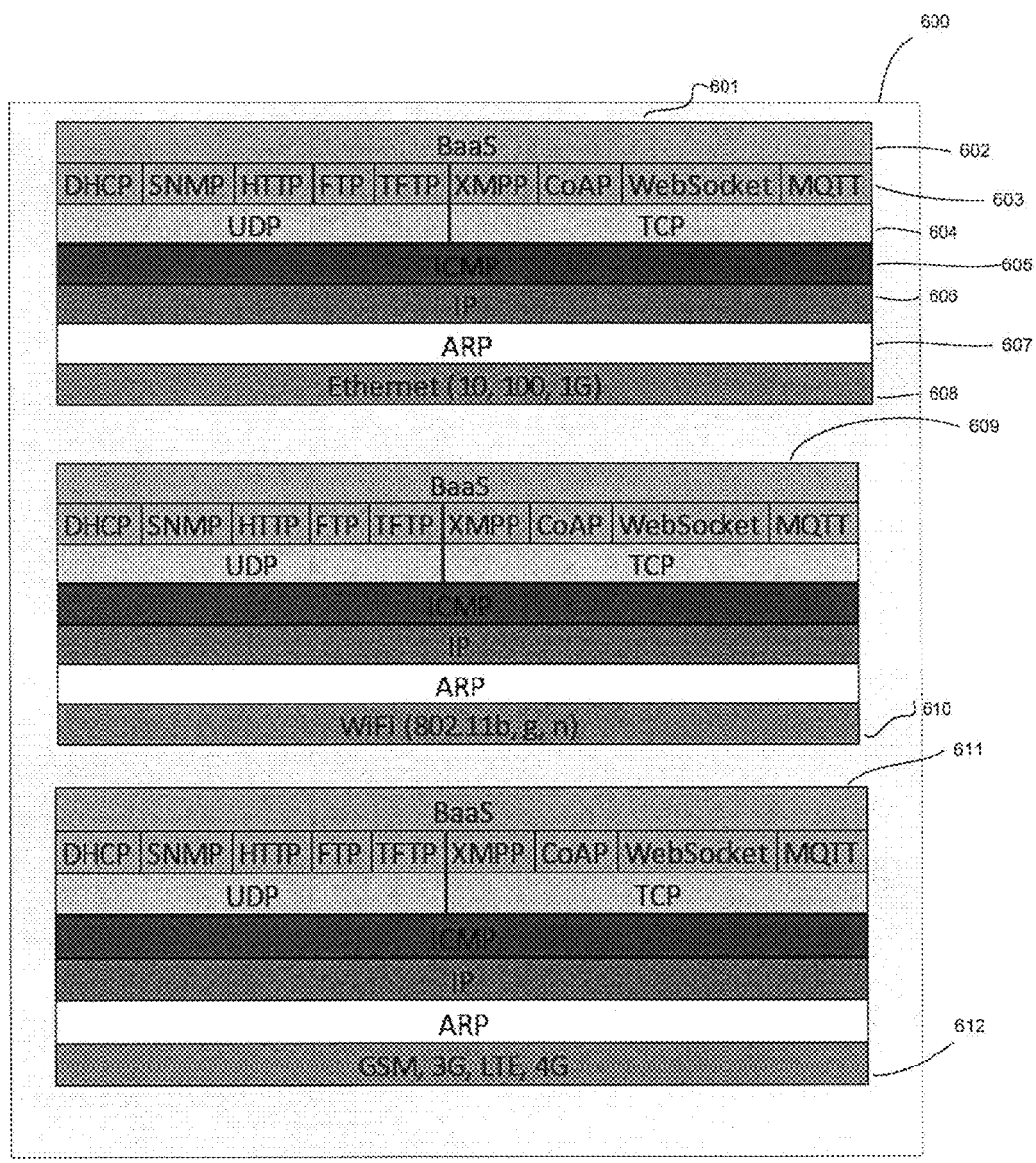
FIG. 6 illustrates a BaaS chip or module software stack in accordance with one embodiment.

Referring now to FIG. 6 three embodiments of an Internet Stack 600 are illustrated: a first Internet stack 601, a second Internet stack 609 and a third Internet stack 611. Any of these embodiments can be included the Internet stack 504 illustrated in FIG. 5 in various embodiments.

Each Internet stack 601, 609, 611 includes a bottom layer that is a physical layer. The first Internet stack 601 has a bottom layer 608 for Ethernet with 10M. 100M or 1G speed. The second Internet stack 609 has a bottom layer 610 for Wi-Fi. The third Internet stack 611 has a bottom layer 612 for cellular technology such as GSM, 3G, 4G, and LTE. In each embodiment, the physical layer has ARP 607, IP 606, ICMP 605, TCP/UDP 604 and DHCP, SNMP, HTTP, FTP, TFTP, XMPP, CoAP, Websocket and MQTT 603 protocols located above it in the stack. All of these protocols enable a device to communicate with other devices including a cloud backend system via the Internet. A BaaS layer 602 is located at the top of the stack in each of the illustrated Internet stacks 601, 609, 611. In accordance with various embodiments, the BaaS layer 602 implements all API calls to the cloud backend system.

Figure 7:
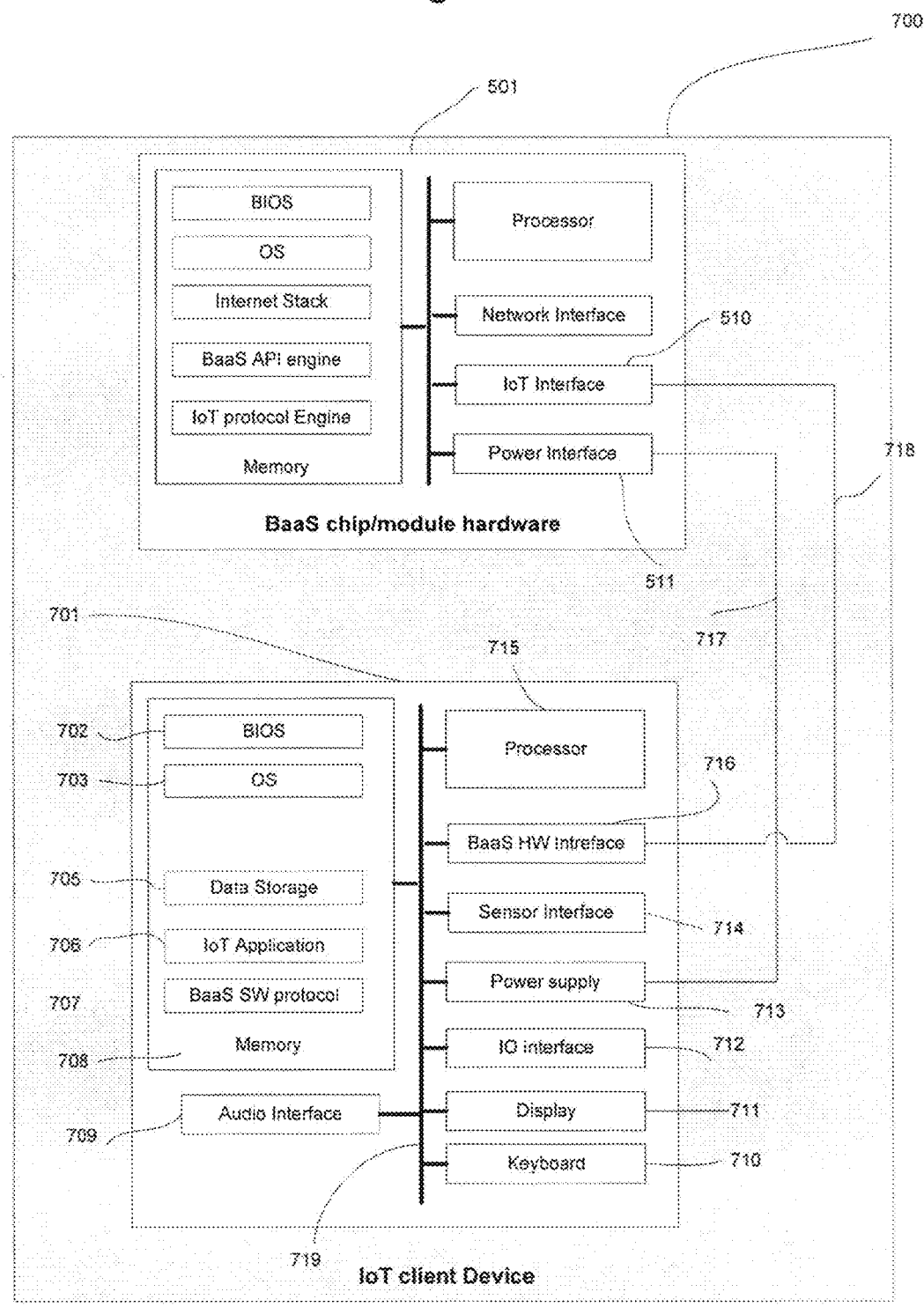
FIG. 7 illustrates a client IoT device using BaaS chip or module in accordance with one embodiment.

The various embodiments of FIG. 7, FIG. 8 and FIG. 9, illustrate a BaaS chip/module that can greatly reduce complexity of IoT App development to just the device itself. As a result, the developer need not commit resources to developing an Internet connection, or backend tasks such as bring data to the cloud, etc.

FIG. 7 shows one embodiment of IoT client device 700 that, in various embodiments, can include many more or less components than those shown in the illustrated embodiments. For example, the IoT Client device 700 can represent at least one embodiment of IoT client devices shown in FIG. 1. According to various embodiments, the IoT client device can at least consist of an IoT module 701 and a BaaS chip/module 501 as illustrated in FIG. 7.

According to the illustrated embodiment, the IoT module 701 includes a processor 715 in communication with memory 708 via bus 719. Inside IoT module memory there is at least an IoT Application 706, Data Storage 705 and a BaaS SW protocol 707. The IoT module 701 includes a BaaS hardware Interface 716 to connect BaaS chip/Module 501 via interface 718. A power supply 713 provides power to BaaS chip/module via interface 717. The IoT module 701 may have a Senor interface 714 or has sensing function built-in. The IoT module 700 can also include power supply 713, audio interface 709, display 711, keypad 710, and input/output interface 712.

Power supply 713 may provide power to client device 700. A rechargeable or non-rechargeable battery may be used to provide power. The power may also be provided by an external power source, such as an AC adapter or a powered docking cradle that supplements and/or recharges the battery.

Audio interface 709 may be arranged to produce and receive audio signals such as the sound of a human voice. For example, audio interface 709 may be coupled to a speaker and microphone (not shown) to enable telecommunication with others and/or generate an audio acknowledgement for some action. A microphone in audio interface 709 can also be used for input to or control of IoT client device 700, e.g., using voice recognition, detecting touch based on sound, and the like.

Display 711 may be a liquid crystal display (LCD), gas plasma, electronic ink, light emitting diode (LED), Organic LED (OLED) or any other type of light reflective or light transmissive display that can be used with a computing device. Keypad 710 may comprise any input device arranged to receive input from a user. For example, keypad 710 may include a push button numeric dial, or a keyboard. Keypad 710 may also include command buttons that are associated with selecting and sending images.

The IoT module 701 may also comprise input/output interface 712 for communicating with external peripheral devices or other computing devices such as other client devices and network devices. The peripheral devices may include an audio headset, display screen glasses, remote speaker system, remote speaker and microphone system, and the like. Input/output interface 712 can utilize one or more technologies, such as Universal Serial Bus (USB), Infrared, Wi-Fi, WiMax, Bluetooth™, and the like.

The IoT client device 700 may include a browser application residing inside BaaS chip/module 501 that is configured to receive and to send web pages, web-based messages, graphics, text, multimedia, and the like. The IoT client device's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

The memory 708 may include RAM, ROM, and/or other types of memory. The memory 708 illustrates an example of computer-readable storage media (devices) for storage of information such as computer-readable instructions, data structures, program modules, sensor data or other data. While the term "computer-readable" is employed herein, information and instructions can also be referred to as "processor-readable." The memory 708 may store BIOS 702 for controlling low-level operation of IoT module 701. The memory may also store operating system 703 for controlling the operation of IoT module 701. It will be appreciated that this component may include a general-purpose operating system such as a version of UNIX, or LINUX™, or a specialized embedded computer communication operating system such as Android or the FreeRTOS real-time operating system. The operating system may include, or interface with a Java virtual machine module that enables control of hardware components and/or operating system operations via Java application programs.

The Memory 708 may further include one or more data storage 705, which can be utilized by IoT module 701 to store, among other things, applications 706 and/or other data. For example, data storage 705 may also be employed to store sensor data. Data storage 705 may further include program code, data, algorithms, and the like, for use by a processor, such as processor 715 to execute and perform actions. In one embodiment, at least some of data storage 705 might also be used for temporary store updated code.

The IoT application 706 may include computer executable (or processor-executable) instructions which, when executed by the processor 715, transmit, receive, and/or otherwise process instructions and data. In at least one of the various embodiments, IoT application may contain BaaS SW protocol to access cloud backend services via BaaS Chip/Module 501.

FIG. 8 and FIG. 9 illustrate a process that can employ various embodiments of the BaaS chip/module 501 in operation with an IoT application and a backend platform/system. FIG. 8 illustrates a flowchart 800 and FIG. 9 illustrates a flowchart 900 that depict a process by which an IoT application employs a BaaS chip/Module 501.

The process begins at a "power up" act 801. The BaaS chip/module conducts system initialization and network connection initialization at act 802. At act 803, the process calls User Management APIs using pre-assigned unique ID to sign up with the backend if it is the first time sign up and get a new unique ID based on pre-assigned ID using an ID assignment algorithm. If it signed up before, the process call login APIs to log into backend. The next act 805 is a decision block to see if it receives a request from IoT processor 715 through IoT interface. If there is a request from IoT processor 715, process will move to act 806, otherwise it moves to 812.

The acts 805, 806, 807, 808, 809 and acts 901, 902, 909 in FIG. 9 are parts of IoT protocol engine 506. Act 806 is another decision block to check if the request received in previous act is a valid process according to SW protocol 524. If it is a valid request, the process moves on to act 807, otherwise it moves to act 812. Act 807 checks if the request is a data management request. In the case the request is call for data management for example, a data store/retrieve, act 810 as part of BaaS API engine 505 will be executed. If the request is not a data management request at act 807, the process moves to act 808.

The acts 810, 811 and 906, 907, 908 in FIG. 9 are part of BaaS API Engine 505 in FIG. 5. Act 810 calls APIs to store/retrieve data etc. At act 808, the process checks to see whether the request is a device management request such as adding or removing a sensor device. The process moves to act 811 if it is, otherwise the process moves to act 809. Act 811 calls APIS to add/remove devices. Both act 809 and act 812 are connectors to continue the process as illustrated FIG. 9.

As illustrated in to FIG. 9, the process starts act 901 which is act 809 illustrated in FIG. 8. The process moves to act 902 to check if the request is a messaging request. If the check result is true, the process moves to act 906. Otherwise the process moves to act 909. At act 906, the process calls APIs to handle various messaging task. For example, the tack can be publishing a message to a messaging channel or get message from another messaging channel. At act 909, the process checks to determine whether the request is an enterprise application/database request. If confirmed, the process moves to act 907, otherwise the process moves to act 904. At act 907, the process makes API calls to identify itself to Enterprise application/database first, and then it handles related operations. At the end of each of acts 810, 811, the process moves to act 812 which is the same as act 903. The process then moves to act 904. The process also moves to act 904 following each of acts 906, 907. At act 904, the process determines whether the request is a valid request from the backend. If a valid request, the process moves to act 908, otherwise it moves to act 905 which is the same as act 804 of FIG. 8 which start the cycle again. At act 908, the process executes backend initialized tasks and then moves to act 905.

Figure 11:
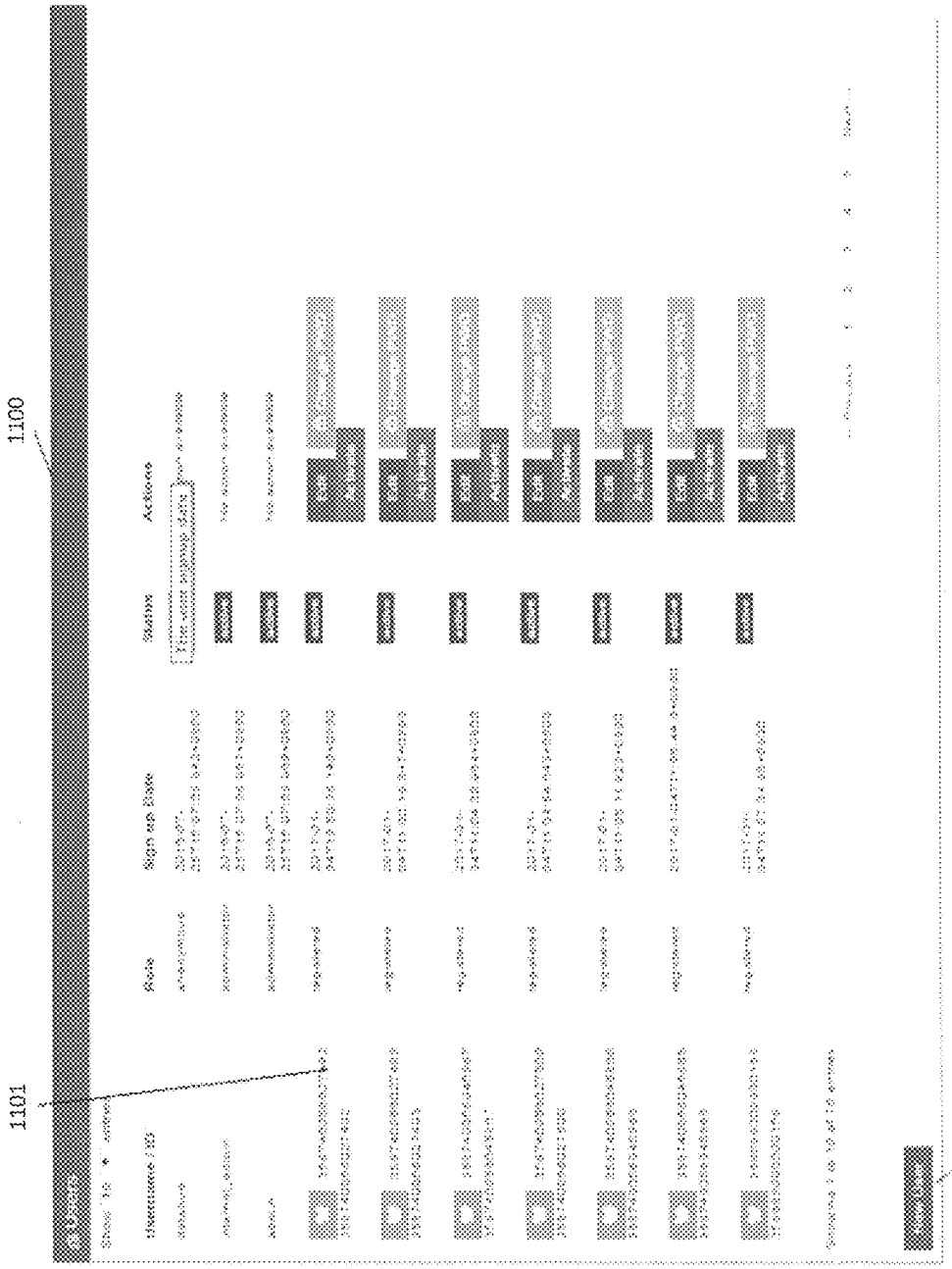
Figure 12:
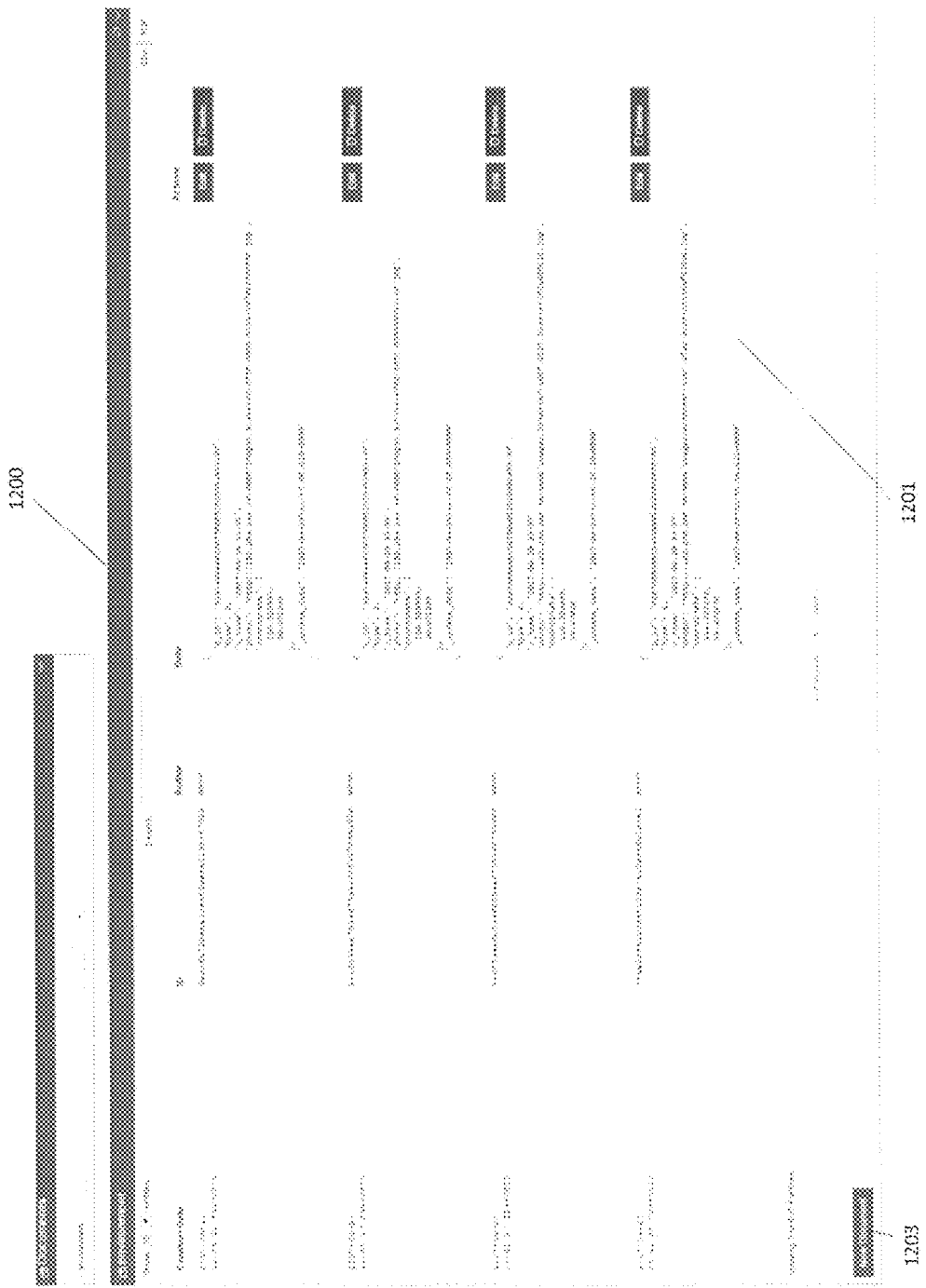
Figure 13:
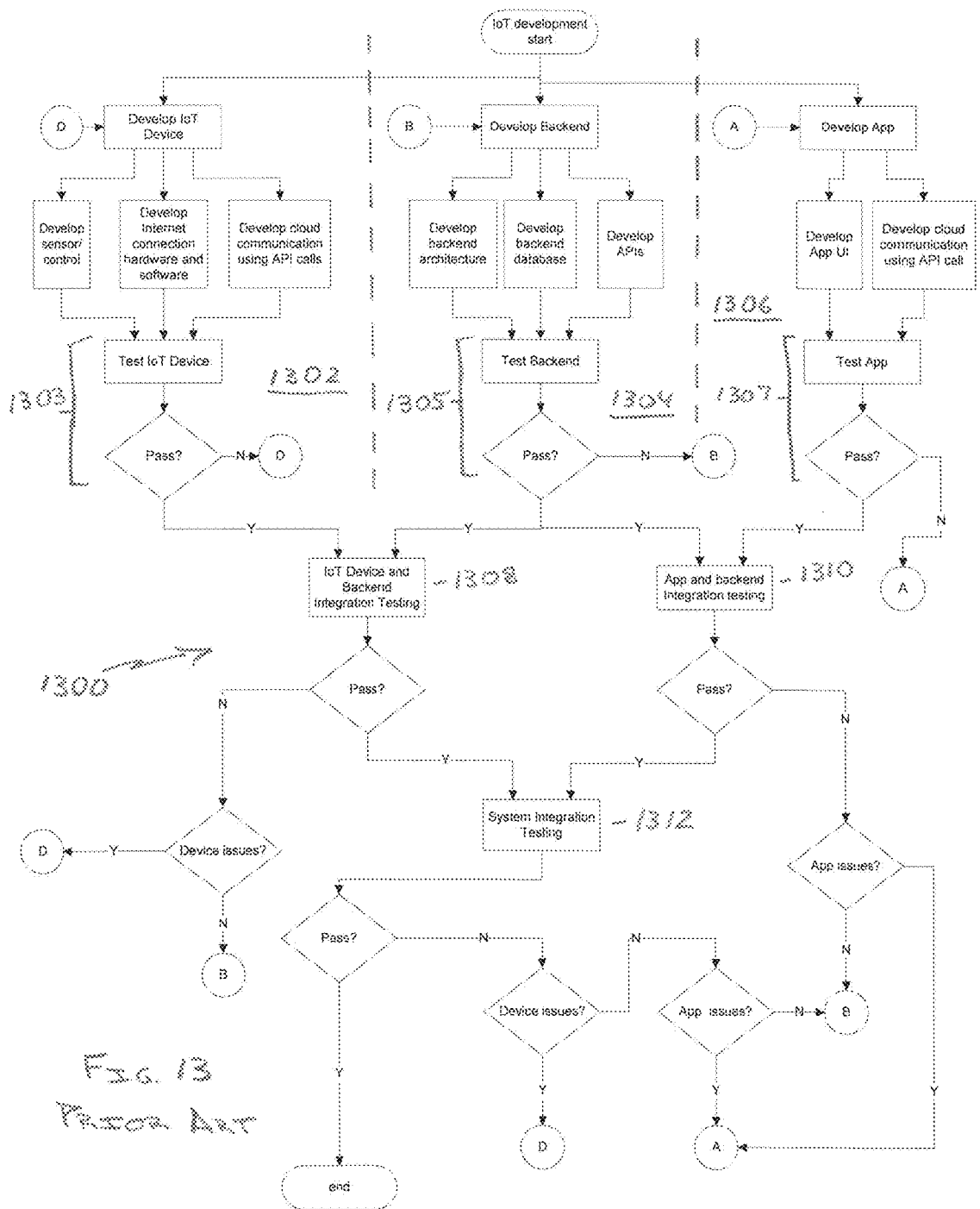
FIG. 13 illustrates a flow diagram of a first IoT development process according to the prior art.

In order to help IoT application developers develop their application, a dash board of Backend system typically is provided. FIG. 10, FIG. 11 and FIG. 12 are example embodiments of an IoT platform dash board. The dash board provides a user interface by which a developer can view and modify the status of the system. The dashboard 1000 provides a quick view of backend status, for example: graphical element 1002 provides a quantity of total documents; graphical element 1003 provides a quantity of total files in total; and graphical element 1004 shows how documents distributed among different usage. In the illustrated example, there are 1048 log document and 407 activity document. In FIG. 11, graphical element 1100 provides a list of users, and graphical element 1101 provides a user's details, for example, user ID, user role, and user status. In addition, a user may be edited or suspended here. Graphical element 1102 enables a developer to add a new user. FIG. 12 illustrates the graphical interface for the developer showing a user and its associated devices, including devices name, ID, when it was added etc.

Referring now to FIG. 15, a development process 1500 is illustrated in accordance with various embodiments. The development process 1500 can be employed, for example, to develop client IoT devices 101, 104, 107 for operation with a backend services platform as illustrated in FIG. 1. The process 1500 is employed, for example, when development includes: development of the client IoT device(s); development of a web and/or mobile app employed with the IoT device(s); and integration of the client IoT device and the application with the backend services platform.

The process 1500 includes each of device development 1502, integration with the backend 1504, and app development 1506. The device development includes an act of developing the IoT device 1508, an act of developing sensors and controls 1510, an act of developing cloud communication 1512, an act of testing the IoT device 1514 and an act of evaluating the test results 1516. The integration 1504 includes an act of choosing the IoT tool and IoT module/chip 1504 and an act of learning simple protocols and simplified API calls 1520. The app development 1506 includes an act of developing the app 1522, an act of developing the user interface (UI) 1524, an act of developing cloud communication using API calls 1526, an act of testing the app 1528 and an act of evaluating the test results 1530.

According to the illustrated embodiment, the process 1500 also includes an act of testing the integration of the IoT device and the backend 1532 and an act of evaluating the test results 1534. The process further includes an act of testing the integration of the app and the backend 1536 and an act of evaluating the test results 1538. In accordance with the illustrated embodiment, the process 1500 also includes an act of testing the system integration 1540, an act of evaluating the test results 1542 and an act of evaluating whether test failures are a result of the newly developed client IoT device 1544.

In operation, the process begins with the start of development at act 1501. The device development 1502 begins with the act of developing the client IoT device 1510, for example, by integrating a backend services module 500 with an IoT device. In one embodiment, the backend services module is include in electronic hardware, for example, a chip including a processor and memory including a backend services engine, IoT protocol engine and an Internet stack (for example, the backend services chip 103 illustrated in FIG. 1). According to another embodiment, the backend services module is provided as a software module (for example, the backend services module 106 illustrated in FIG. 1). At act 1512 the cloud communication for the client IoT device is developed by following the backend services module protocol. The integration of the backend services module and the IoT device are tested at the act of testing the IoT device 1514. The test results are evaluated and a determination is made whether the integration passed the testing at the act of evaluating the test results 1516. If the client IoT device successfully passes the testing, the device development 1502 moves to the act of testing the integration of the IoT device and the backend 1532. Alternatively, the device development 1502 returns to the act of developing the IoT client device 1508 to correct the problems identified in testing.

The integration with the backend 1504 begins with the act of selecting the IoT tool and the backend services module for use in the project 1518. The process 1500 continues with the developer performing the act of learning simple protocols and simplified API calls 1520. The process moves to each of act of testing the integration of the IoT device and the backend 1532 and the act of testing the integration of the app and the backend 1536.

The app development 1506 begins with the act of developing the app 1522. Once the app is developed, the process moves to each of act of developing the user interface (UI) 1524 and the act of developing cloud communication using API calls 1526. Each of those acts is followed by the act of testing the app 1528. The test results are evaluated and a determination is made whether the app passed the testing at the act of evaluating the test results 1530. If the app successfully passes the testing, the app development 1506 moves to the act of testing the integration of the app and the backend 1536. Alternatively, the app development 1506 returns to the act of developing the app 1522 to correct the problems identified in testing.

Each of the act of testing the integration of the IoT device and the backend 1532 and the act of testing the integration of the app and the backend 1536 are followed by a respective evaluation of the test results. Following the act of testing the integration of the IoT device and the backend 1532, the process 1500 moves to the act of evaluating the test results 1534. If the integration passes the test, the process 1500 moves to the act of testing the system integration 1540. Alternatively, the process 1500 returns to the act of developing the client IoT device 1508 to correct the problems identified in testing.

Following the act of testing the integration of the app and the backend 1536, the process 1500 moves to the act of evaluating the test results 1538. If the integration passes the test, the process 1500 moves to the act of testing the system integration 1540. Alternatively, the process 1500 returns to the act of developing the app 1522 to correct the problems identified in testing.

The act of testing the system integration 1540 is followed by the act of evaluating the test results 1542. If the system integration passes the test, the process 1500 is completed at act 1546. If the system integration fails the test, the process 1500 moves to the act of evaluating whether test failure is a result of the newly developed client IoT device 1544. The process 1500 returns to the act of developing the IoT device 1508 if the test failure is a result of an issue with the client IoT device to correct any device issues. Alternatively, the process 1500 returns to the act of developing the app 1522 to correct the problems identified in testing.

The process 1500 reduces time and cost for developing client IoT devices while greatly improving the efficiency of the development process. For example, including a combination of an embedded Internet stack, backend services API engine and IoT protocol engine eliminates the need for the development of separate internet connection hardware and software. In prior approaches, for example, the processes 1300 and 1400, the required development of the internet connection hardware and software increases the development time and complexity. Because each IoT developer is developing the preceding from scratch there is also a corresponding risk that IoT device testing will identify problems that must be corrected.

The process 1500 also greatly reduces the time and cost for backend development. For example, the process 1300 requires that each of a backend architecture, backend database and API calls to the backend be developed in the backend development 1304. The client IoT device development process 1500 is also improved relative to the IoT development process 1400 illustrated in FIG. 14. For example, the backend development 1404 required in the process 1400 includes learning API calls for the third party backend, developing an application database and testing the backend. Here too, the testing is likely an iterative process in which problems are identified and solved serially in a time consuming "test and correct" manner until debugging is complete.

In contrast to the preceding, the process 1500 only tasks the developer with a selection of the IoT tool and the IoT module/chip for use in developing the client IoT device. The developer then need only learn a simple protocol and simplified API calls needed to invoke services and functions provided by the backend system. According to the illustrated embodiment, separate testing of the backend is not required in the process 1500. Instead, the process 1500 moves directly to testing the integration of the client IoT device with the backend and the testing of integration of the application and the backend.

The following example embodiments are described to further demonstrate how developers can employ some embodiments of the IoT development platform described herein.

Application case 1: A patient remote monitoring system. In this system, there are various patient monitoring sensors; example patient sensor may be an activity sensor, a sleep sensor, a weight scale, a blood pressure monitor, a blood glucose monitor. All patient sensors may be sourced off the shelf. There is also a sensor gateway for collect data and configure sensor, there also patient mobile Application running on an IPhone or Android phone, a service web application and a health care providers mobile application. The developer needs to develop the sensor gateway and all applications. Embodiments of the IoT development platform described herein can assist the developer in many ways. First, the IoT developer can integrate the BaaS chip/module 501 into the sensor gateway to connect to cloud backend.

This approach allows the developer to focus on developing hardware and firmware for sensor discovery, sensor data collection and maybe a simple gateway interface because the BaaS chip/module 501 has addressed the communication between the client IoT device and the backend resources via the cloud. On the other end for mobile applications and web application, the developer can focus on the application user interface because all backend calls are accomplished via native SDK that have all API calls offered by IoT development platform. Further, on the data analysis side, IoT development platform offers API calls to help developers as well.

Application case 2: A home security system. In this example, the IoT device includes a 1080p HD Camera, 147° a wide-angle lens, automatic night vision, motion detection sensors, a multi-axis accelerometer, an ambient light sensor, a capacitive touch sensor, an ambient temperature sensor, a humidity sensor, an air quality sensor, a high-quality microphone, a built-in speaker, a 90+dB siren, a fire alarm sensor and a carbon monoxide sensor. By using the BaaS chip/module 501, a developer has instant connectivity to backend and internet with 2.4 GHz Wi-Fi (802.11 b/g/n) and wired Ethernet. The developer can focus on various sensors hardware/firmware and a user interface. The result is fully functional IoT home security device developed much more efficiently than possible with prior approaches. In addition, the backend platform simplifies mobile application development. For example, a developer can get home video and easily stream it to the backend 200 and a mobile Application 111. One example scenario, has an intruder enter a home and trigger the home security device to cause an alert to be sent to the mobile application 111. The user of the mobile application 111 receives the alert and sees the intruder in the video. The user can send a command to arm the siren. In this scenario, all messaging between the mobile application and the home security device goes though the BaaS chip/module 501 and backend services.

Application case 3: a gas pipe monitoring system. In this system, a gas pipe is equipped with a leaking detection system which includes leakage detection sensors and a mobile or web application used to alert a human user. By using the BaaS chip/module 501, the developer has instant connectivity to the backend and the internet using a cellular network. For example, when there is leakage detected, a message can be generated by the sensor and sent to the mobile or web application. Again, connectivity, messaging between sensor and web/mobile application are performed by BaaS chip/module 501 and BaaS platform.

Some embodiments described herein may be practiced on a computer system that includes, in general, one or a plurality of processors for processing information and instructions, RAM, for storing information and instructions, ROM, for storing static information and instructions, a data storage unit such as a magnetic or optical disk and disk drive for storing information and instructions, modules as software units executing on a processor, an optional user output device such as a display device (e.g., a monitor) for displaying information to the computer user, and an optional user input device.

As will be appreciated by those skilled in the art in view of the disclosure herein, the present examples may be embodied, at least in part, a computer program product embodied in any tangible medium of expression having computer-usable program code stored therein. For example, some embodiments described herein with reference to flowchart illustrations and/or block diagrams of methods, apparatus (systems) and computer program products can be implemented by computer program instructions. The computer program instructions may be stored in computer-readable/processor-readable media that can direct a computer, controller or other programmable data processing apparatus to function in a particular manner, such that the instructions stored in the computer-readable media constitute an article of manufacture including instructions and processes which implement, for example, the function/act/step specified in the flowchart and/or block diagram. These computer program instructions may be provided to a processor of a general purpose computer, special purpose computer, or other programmable data processing apparatus to produce a machine, such that the instructions, which execute via the processor of the computer or other programmable data processing apparatus, provide a system to implement the functions/acts specified in the flowchart and/or block diagram act or acts.

What is claimed is:

1. A method of integrating a cloud connected backend system with an IoT client device to provide services to the IoT client device via a wide area network, the method comprising:
   providing a backend system configured to provide at least one service selected from a group consisting of: data management, file management, user management, and device management;
   including an IoT device and a backend services module in an IoT client device;
   receiving by the backend services module, an access request communicated from the IoT device to the backend services module for access to a service included in the at least one service, the access request communicated in a message format native to the IoT device and non-native to the backend system;
   automatically converting, by the backend services module, the access request into an API call in a format native to the backend system;
   configuring the backend system to operate to provide the service on receipt of the API call from the backend services module;
   programming the IoT device using a protocol that allows a developer to work in a format native to the IoT device to generate the access request communicated to the backend service module, wherein the format native to the backend system is non-native to the IoT device; and
   automatically generating a User Management API call with the backend services module to initialize the IoT client device when the IoT client device is powered-up, the User Management API call including an ID unique to the IoT client device, the ID previously assigned to the IoT client device by the backend system.

2. The method of claim 1, further comprising:
   including the backend services module in hardware programmed with an initial ID that uniquely identifies the backend services module to the backend system; and
   automatically assigning the ID unique to the IoT client device when the IoT client device is first deployed with the backend services module.

3. The method of claim 2, further comprising employing, by the backend system, an ID assignment algorithm automatically assigning the ID unique to the IoT client device when the IoT client device is first in communication with the backend system via the wide area network.

4. The method of claim 1, wherein the backend system includes at least one database, wherein the IoT client device includes at least one sensor, and wherein the method further comprises:

generating a data management API call with the backend services module to communicate sensor output data from the at least one sensor to the backend system; and storing the sensor output data in the at least one database, the sensor output data stored using the ID to associate the sensor output data with the IoT client device.

5. The method of claim 1, wherein the backend system includes at least one database, wherein the IoT client device includes at least one actuator, and wherein the method further comprises:

generating a device management API call with the backend services module to communicate a status of the at least one actuator to the backend system; and storing the status of the actuator in the at least one database, the status of the actuator stored using the ID to associate the status with the IoT client device.

6. A method of integrating a cloud connected backend system with an IoT client device to provide services to the IoT client device via a wide area network, the method comprising:

providing a backend system configured to provide a plurality of services including at least one of: data management, file management, user management, and device management;

including an IoT device and a backend services module in an IoT client device;

receiving by the backend services module, an access request communicated from the IoT device to the backend services module for access to a service included in the plurality of services, the access request communicated in a message format native to the IoT device and non-native to the backend system;

automatically converting, by the backend services module, the access request into an API call in a format native to the backend system;

configuring the backend system to operate to provide the service on receipt of the API call from the backend services module;

programming the IoT device using a protocol that allows a developer to work in a format native to the IoT device to generate the access request communicated to the backend service module, wherein the format native to the backend system is non-native to the IoT device; and automatically generating a User Management API call with the backend services module to initialize the IoT client device when the IoT client device is powered-up, the User Management API call including an ID unique to the IoT client device, the ID previously assigned to the IoT client device by the backend system.

* * * * *